United States Patent [19]

Yoshimura

[11] Patent Number: 4,742,481
[45] Date of Patent: May 3, 1988

[54] ELECTRONIC DICTIONARY HAVING MEANS FOR LINKING TWO OR MORE DIFFERENT GROUPS OF VOCABULARY ENTRIES IN A CLOSED LOOP

[75] Inventor: Motokazu Yoshimura, Nagoya, Japan

[73] Assignee: Brother Kogyo Kabushiki Kaisha, Aichi, Japan

[21] Appl. No.: 721,805

[22] Filed: Apr. 10, 1985

[30] Foreign Application Priority Data

| Apr. 13, 1984 [JP] | Japan | 59-75391 |
| Apr. 13, 1984 [JP] | Japan | 59-75392 |
| Apr. 13, 1984 [JP] | Japan | 59-75393 |
| Apr. 19, 1984 [JP] | Japan | 59-79578 |

[51] Int. Cl.⁴ .................. G06F 15/02; G06F 15/40
[52] U.S. Cl. ................................... 364/900; 364/419
[58] Field of Search ..................... 364/200, 900, 419

[56] References Cited

U.S. PATENT DOCUMENTS

| 3,780,846 | 12/1973 | Kolpek et al. |  |
| 3,995,254 | 11/1976 | Rosenbaum . |  |
| 4,041,467 | 8/1977 | Cota et al. | 364/900 |
| 4,136,395 | 1/1979 | Kolpek et al. | 364/518 |
| 4,158,236 | 6/1979 | Levy | 364/900 |
| 4,198,906 | 4/1980 | Fujikawa et al. | 364/900 X |
| 4,218,760 | 8/1980 | Levy | 364/900 |
| 4,270,182 | −5/1981 | Asija | 364/900 |
| 4,323,315 | 4/1982 | Demonte et al. . |  |
| 4,328,561 | 5/1982 | Convis et al. | 364/900 |
| 4,339,806 | 7/1982 | Yoshida | 364/900 |
| 4,355,371 | 10/1982 | Convis et al. | 364/900 |
| 4,383,307 | 5/1983 | Gibson, III | 364/900 |
| 4,384,329 | 5/1983 | Rosenbaum et al. | 364/300 |

(Continued on next page.)

FOREIGN PATENT DOCUMENTS 59-26280 2/1984 Japan .

OTHER PUBLICATIONS

V. A. Mayfield, "8-Bit Character Encoding for Multiple Languages", *IBM Technical Disclosure Bulletin*, vol. 26, No. 2, Jul. 1983, p. 537.

P. S. Cohen et al., "Video Disc Dictionary System", *IBM Technical Disclosure Bulletin*, vol. 25, No. 8, Jan. 1983, p. 4209.

T. L. Adam et al., "Spelling Processing Functions Operator Interface", *IBM Technical Disclosure Bulletin*, vol. 24, No. 10, Mar. 1982, pp. 5003–5008.

R. Hackett, "Spelling Checking Typewriter", *IBM Technical Disclosure Bulletin*, vol. 18, No. 2, Jul. 1975, pp. 530–531.

I. H. Hernandez et al. "Interactive Spelling Correction Aid for a Text Processing System", IBM Technical Disclosure Bulletin, vol. 25, No. 8, Jan. 1983, pp. 4227–4228.

*Primary Examiner*—Thomas M. Heckler
*Attorney, Agent, or Firm*—Parkhurst & Oliff

[57] ABSTRACT

An electronic dictionary comprising a dictionary memory having multiple memory locations each of which comprises a vocabulary-data memory location and an address-number memory location corresponding to each other. The vocabulary-data memory locations store vocabulary data representative of different vocabulary entries including plural groups of entries, each group consisting of the entries of the same nature which include at least one special entry. The vocabulary entries of each group are retrieved in a predetermined order. Each of the address-number memory locations corresponding to the entries of each group except the special entry stores address-number data representative of an address of the vocabulary data which is retrieved next, whereby the entries of each group are successively retrieved. Special data is stored in the address-number memory location corresponding to the vocabulary-data memory location which stores the special entry. If the special data is retrieved upon retrieval of the special entry, the currently retrieved group of entries is linked with another group by a control device which designates the address of an entry of this another group based on the special data, and retrieves the vocabulary data stored in the vocabulary-data memory location at the designated address.

15 Claims, 20 Drawing Sheets

U.S. PATENT DOCUMENTS

| | | | |
|---|---|---|---|
| 4,498,148 | 2/1985 | Glickman | 364/900 |
| 4,499,553 | 2/1985 | Dickinson et al. | 364/900 |
| 4,408,302 | 10/1983 | Fessel et al. | 364/900 |
| 4,413,318 | 11/1983 | Herrington | 364/200 |
| 4,420,817 | 12/1983 | Yoshida | 364/900 |
| 4,438,505 | 3/1984 | Yanagiuchi et al. | 364/900 |
| 4,439,836 | 3/1984 | Yoshida | 364/900 |
| 4,456,969 | 6/1984 | Herzik et al. | 364/900 |
| 4,456,973 | 6/1984 | Carlgren et al. | 364/900 |
| 4,467,446 | 8/1984 | Sakurai | 364/900 |
| 4,481,607 | 11/1984 | Kobayashi et al. | 364/900 |
| 4,499,554 | 2/1985 | Kobayashi | 364/900 |
| 4,502,128 | 2/1985 | Okajima et al. | 364/900 |
| 4,503,426 | 3/1985 | Mikulski | 364/900 X |
| 4,503,514 | 3/1985 | Urquhart | 364/900 |
| 4,542,477 | 9/1985 | Noyori et al. | 364/900 |
| 4,548,520 | 10/1985 | Ueno | 364/518 X |
| 4,559,598 | 12/1985 | Goldwasser et al. | 364/900 X |
| 4,564,301 | 1/1986 | Ueno | 364/519 X |
| 4,567,573 | 1/1986 | Hashimoto et al. | 364/900 |
| 4,580,241 | 4/1986 | Kucera | 364/900 |
| 4,584,667 | 4/1986 | Hashimoto et al. | 364/900 |
| 4,590,560 | 5/1986 | Sado | 364/419 |
| 4,594,686 | 6/1986 | Yoshida | 364/900 |

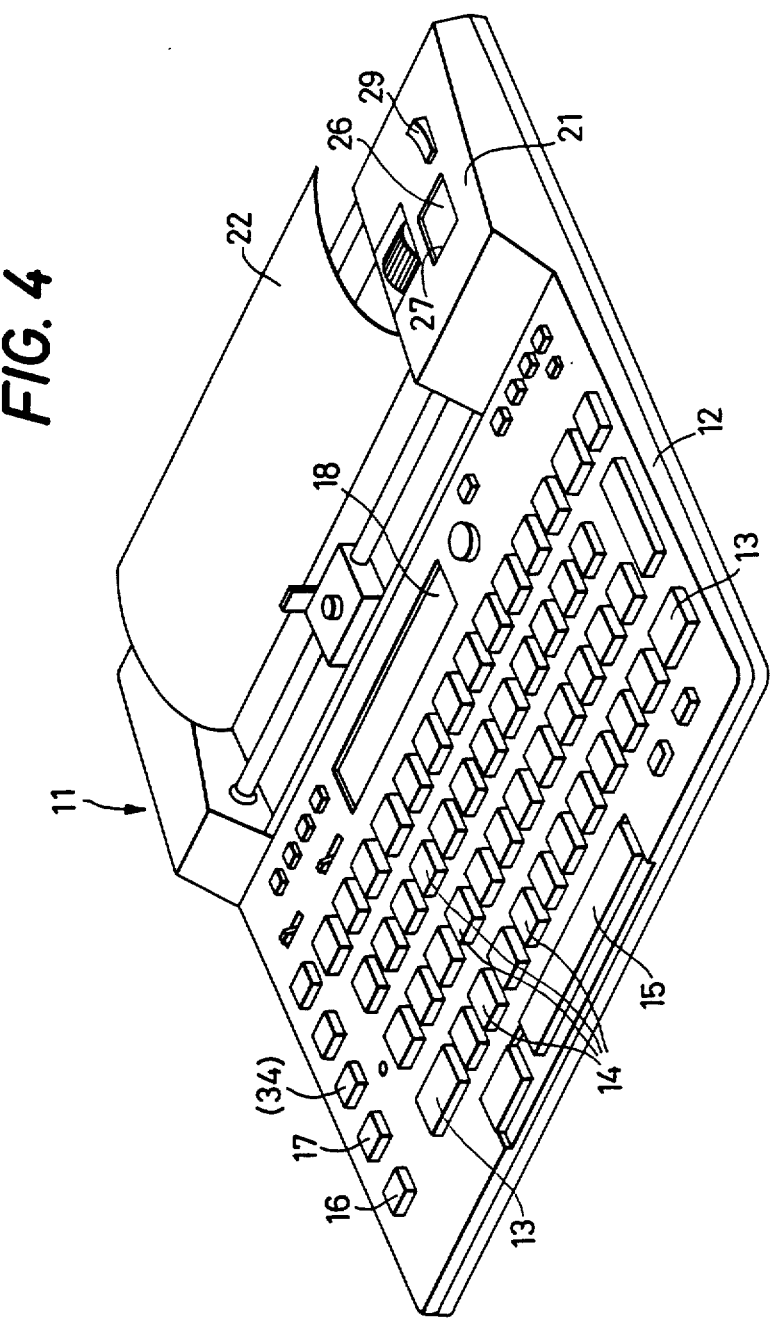

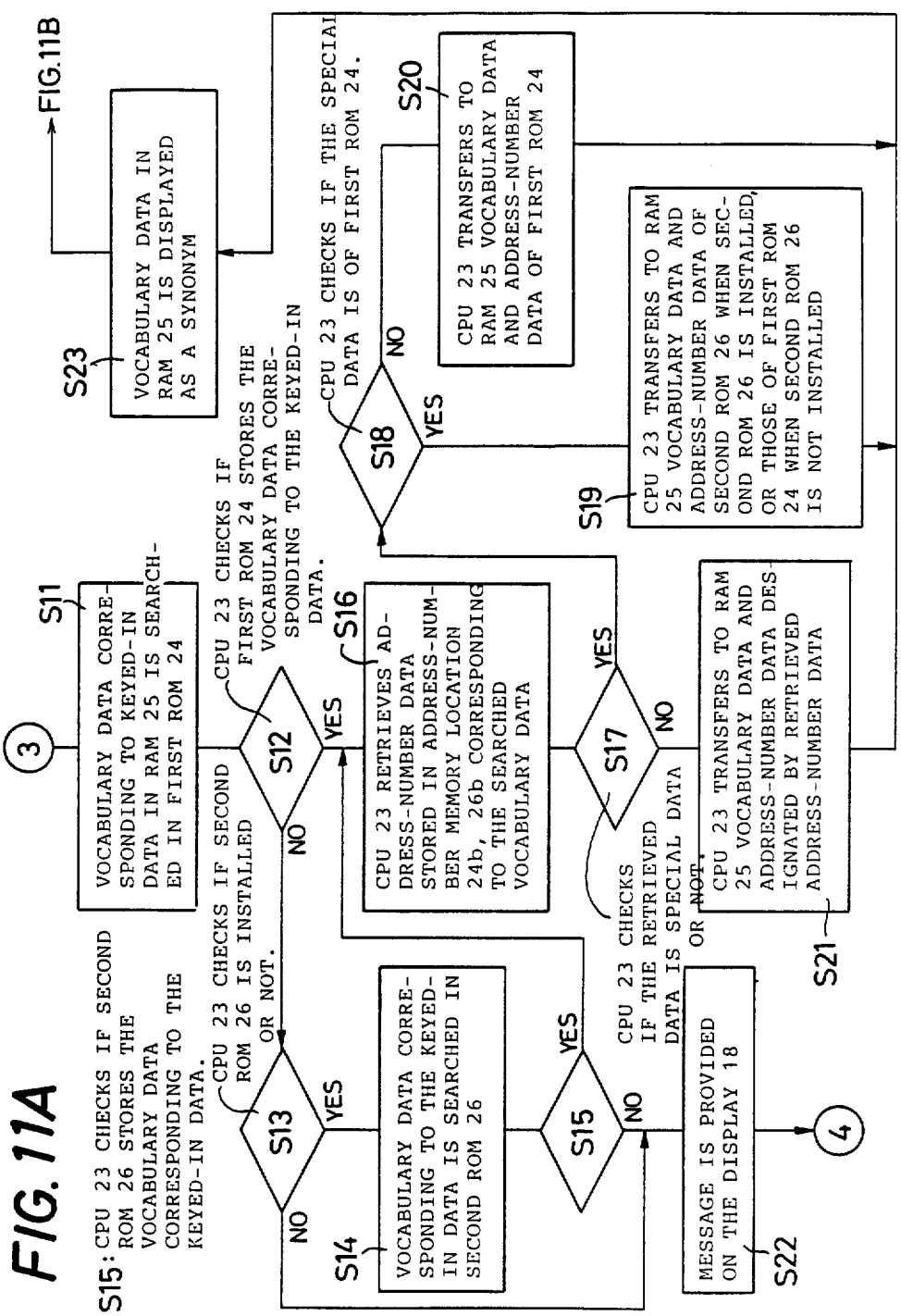

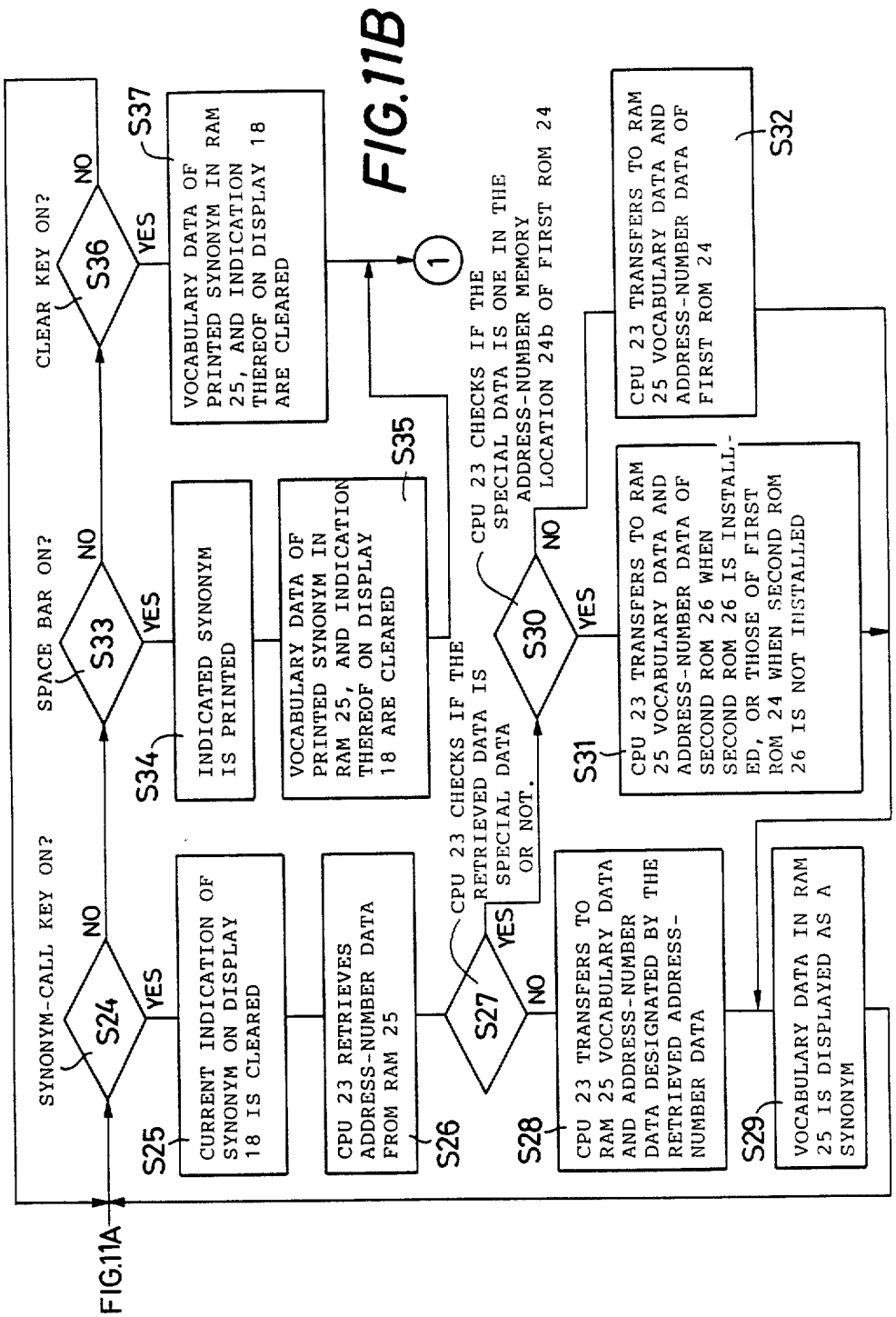

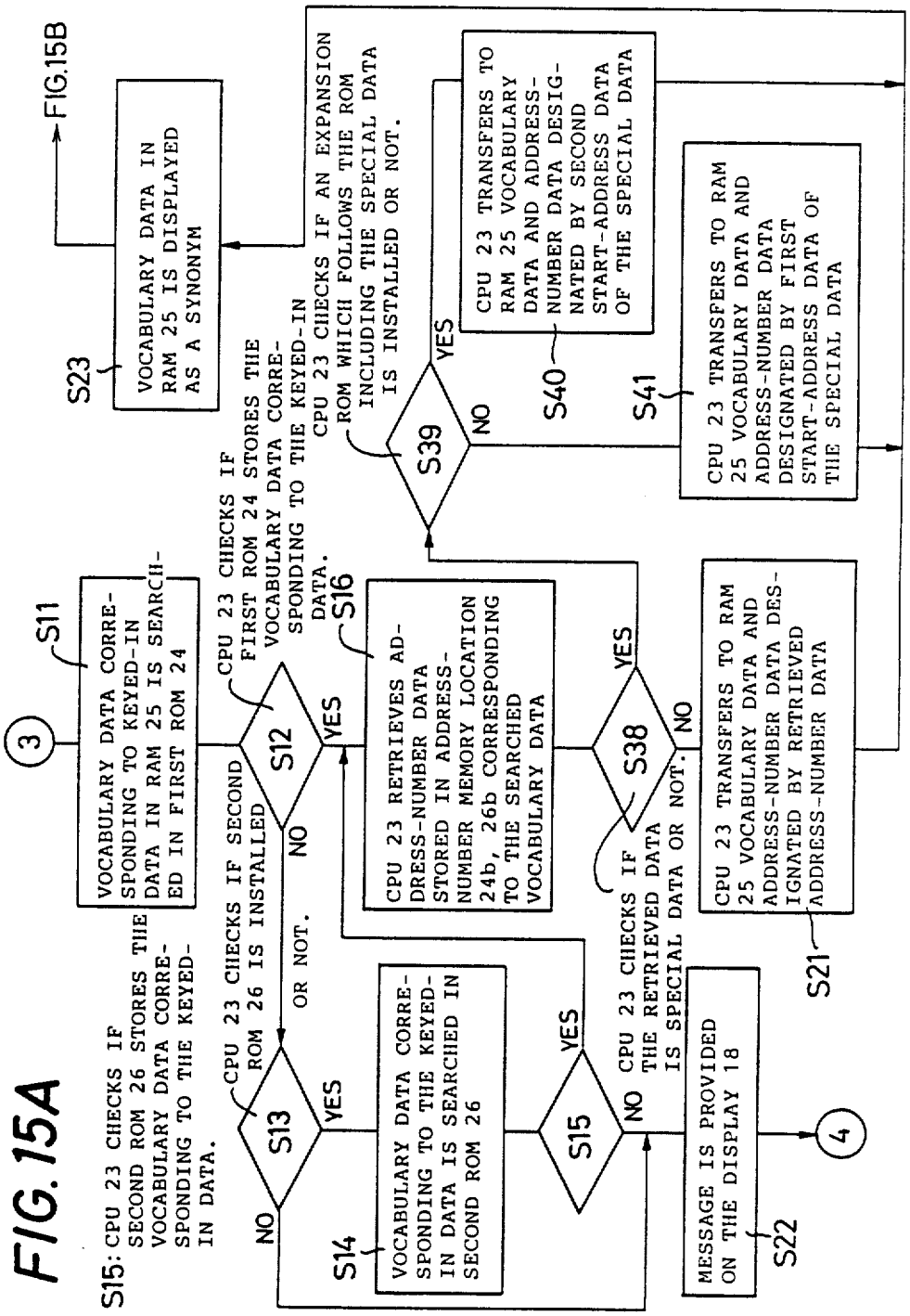

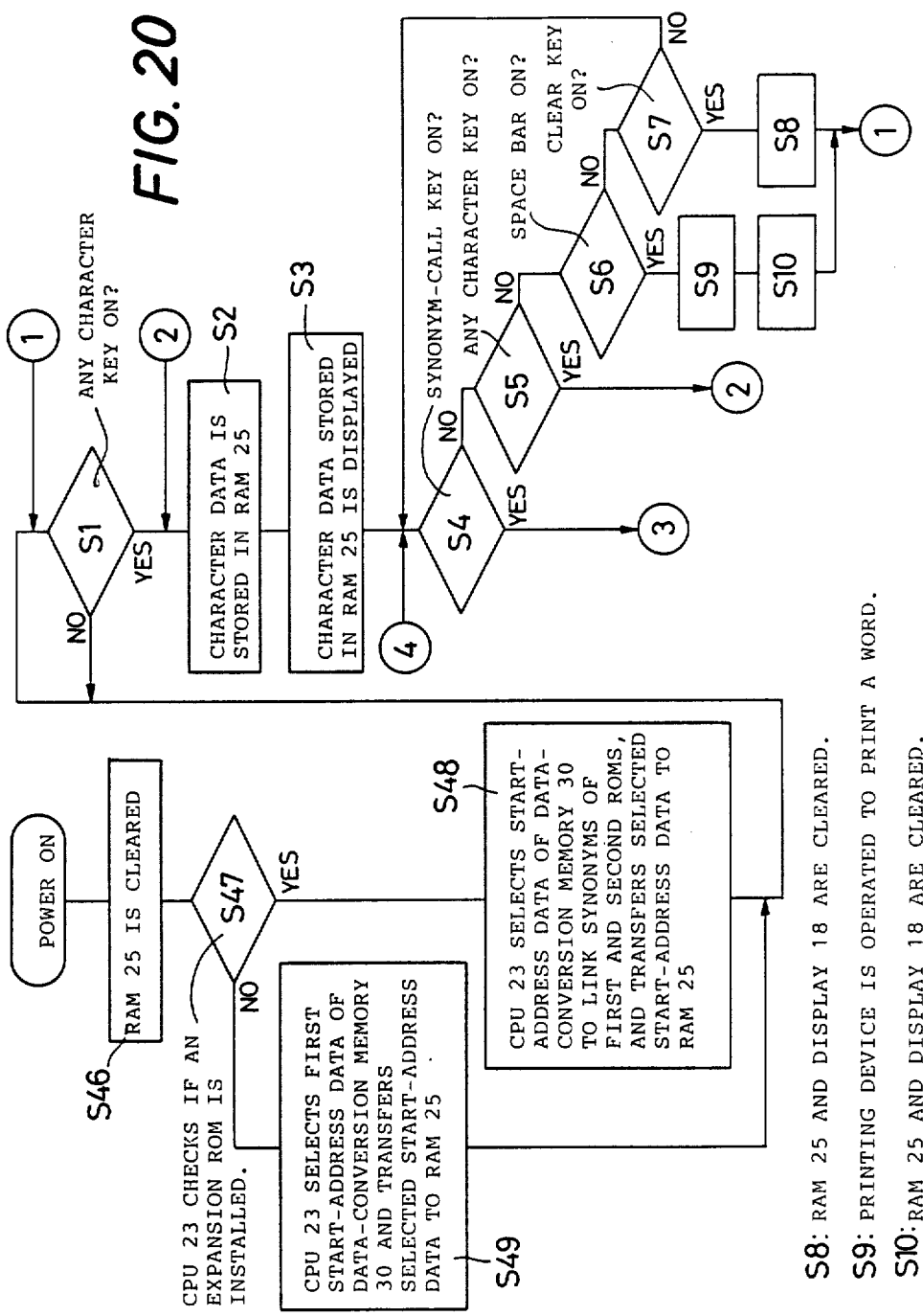

S12: CPU 23 CHECKS IF FIRST ROM 24 STORES THE VOCABULARY DATA CORRESPONDING TO THE KEYED-IN DATA.

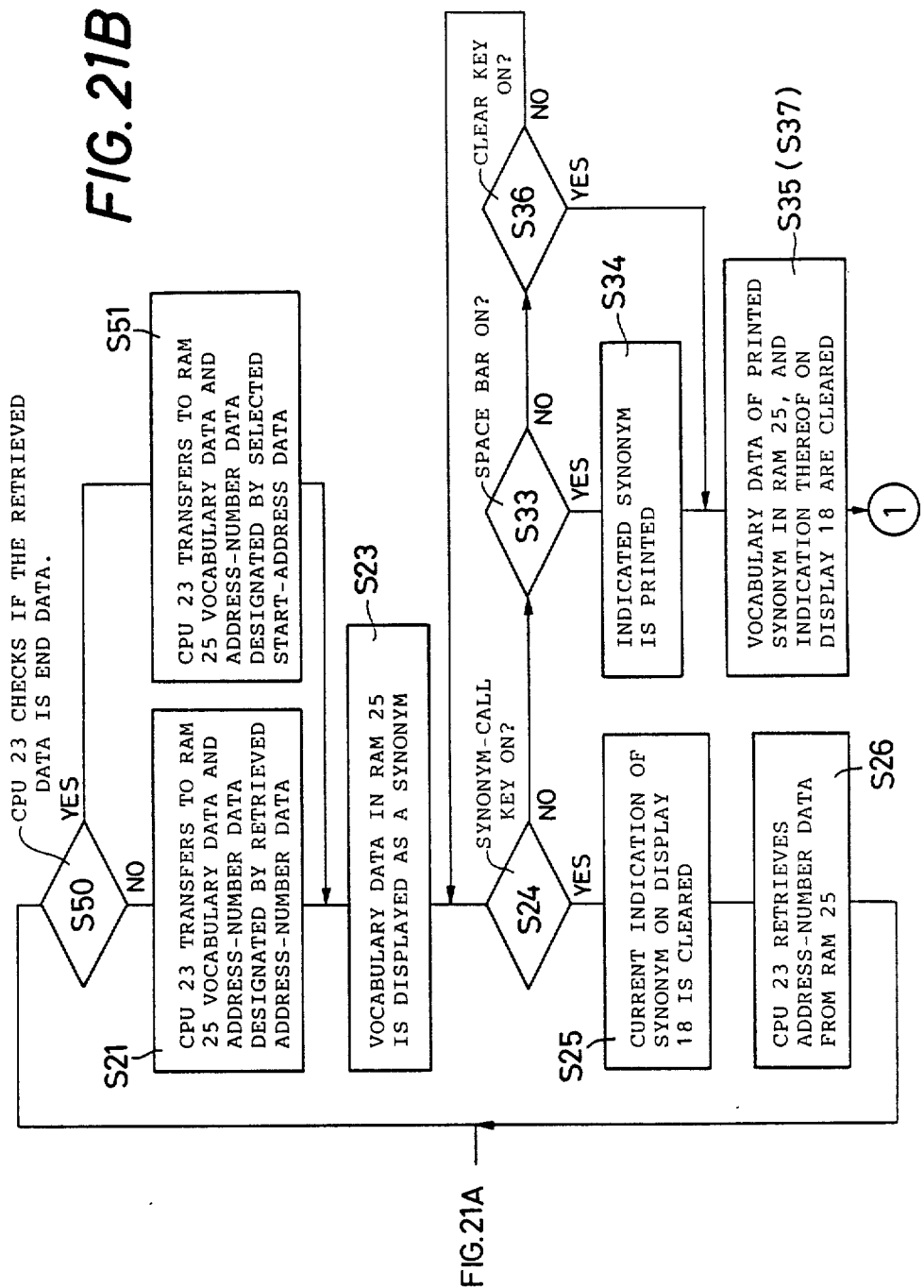

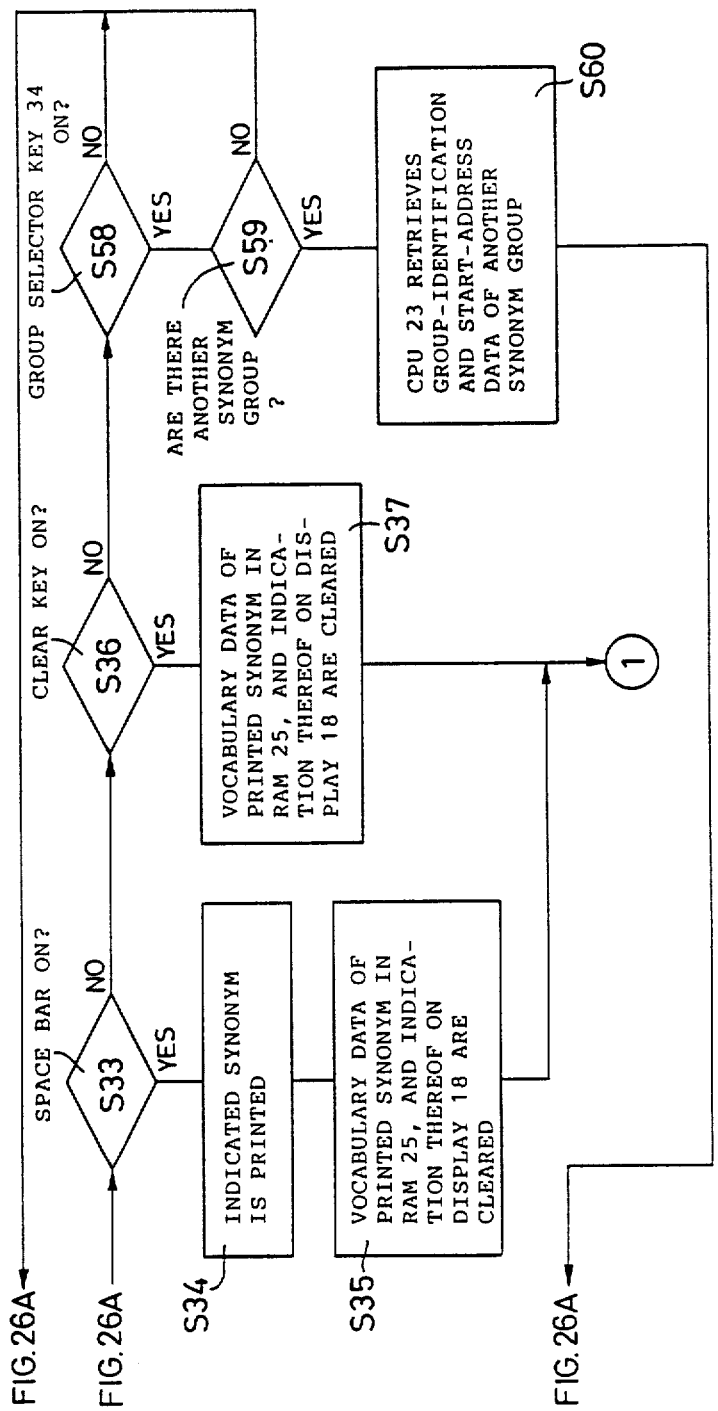

ELECTRONIC DICTIONARY HAVING MEANS FOR LINKING TWO OR MORE DIFFERENT GROUPS OF VOCABULARY ENTRIES IN A CLOSED LOOP

BACKGROUND OF THE INVENTION

The present invention relates to an electronic dictionary device which is capable of displaying one or more synonyms or antonyms of a word, term, phrase or other form of a vocabulary entry which is entered through suitable input means such as keys corresponding to letters of a language or languages.

STATEMENT OF RELATED ART

An electronic dictionary is known, which uses a dictionary memory which stores vocabulary data representative of a multiplicity of vocabulary entries. Such an electronic dictionary is expandable in the number of entries by adding an expansion-dictionary memory which provides additional vocabulary entries which are not covered by the basic-dictionary memory of the dictionary.

An example of a dictionary memory M is shown in FIG. 1. The dictionary memory M stores a multiplicity of word data representative of vocabulary entries of a language (most of which are in the form of words). As shown in FIG. 1, the word data are stored in a vocabulary storage section 1 which comprises many word-data memory locations at which the respective word data are stored. Corresponding to the word-data memory locations, there are provided synonym-data memory locations which constitute a synonym-data storage section 2. In each of the synonym-data memory locations, there is stored at least one synonym data which represents a synonym of a word stored in the corresponding word-data memory location. The word-data memory location and the synonym-data memory location constitute a data memory location. Thus, the dictionary memory M which consists of the vocabulary storage section 1 and the synonym-data storage section 2, comprises multiple data memory locations identified by respective addresses which correspond to multiple different words and multiple sets of synonyms of these different words.

For example, as shown in FIG. 2, word-data representing a word "CONSIDER" is stored in the word-data memory location 1' of the first data memory location. In the corresponding synonym-data memory location 2', there are stored synonym-data which represent synonyms of the word "CONSIDER", such as "THINK", "REFLECT", and "DELIBERATE". Accordingly, each of such synonym-data memory location 2' uses a larger memory area than the corresponding word-data memory location 1' which stores the word data for a single word. Therefore, the synonym-data storage section 2 is required to have a relatively larger memory capacity, which leads to increased memory capacity requirement of the dictionary memory M.

To obviate the above-indicated incovenience, the assignee of the present application developed an improved electronic dictionary as disclosed in U.S. Pat. No. 4,688,192 granted on Aug. 18, 1987, to U.S. application, Ser. No. 625,392 filed June 28, 1984, which was assigned to the present assignee. This electronic dictionary employs a dictionary memory as shown in FIG. 3, which includes a vocabulary data storage section 3 and an address data storage section 4. The vocabulary data storage section 3 consists of a large number of word data memory locations which store word data 5 representative of different words. The address data storage section 4 consist of many address-number memory locations each of which stores address-number data 6 which represents the address of the word data memory location at which is stored the word data 5 representative of a word which is synonymous with the word which is stored in the word data memory location corresponding to the address-number memory location involved. In this arrangement, synonyms of a word may be displayed in a predetermined order according to the address-number data 6 stored in the individual word data memory locations. As exemplified in FIG. 3, words synonymous with each other are displayed in a loop in the order of "CONSIDER", "THINK", "REFLECT", "DELIBERATE", "CONTEMPLATE" and "STUDY". Consequently, the electronic dictionary has made it possible to use a dictionary memory of relatively reduced storage capacity.

In the case where the dictionary is expanded in its entry capacity by adding an expansion-dictionary memory to the basic-dictionary memory, however, it has not been possible to connect a group of synonyms in the basic-dictionary memory to another group of synonyms in the expansion-dictionary memory, which are synonymous with the synonym group in the basic-dictionary memory. As a result, the search for synonyms of a word is limited within the range of each one of the basic- and expansion-dictionary memories. Thus, it has not been possible to search for and display a word across the two different groups of synonyms in the basic- and expansion-dictionary memories.

It is further noted that a word "THINK", for example, belongs to two different groups of synonyms, e.g., a first group including "CONSIDER", "STUDY", "CONTEMPLATE", "DELIBERATE" and "REFLECT", and a second group including "SUPPOSE", "ASSUME" and "BELIEVE". In this case, the word "THINK" is included in one of the two groups, for example, in the first group. Therefore, it is impossible to search for the word "SUPPOSE" as a synonym of the word "THINK".

Moreover, it is possible that at least one word of one group of synonyms is antonymous to at least one word of another group of synonyms. In this case, it is advantageous or convenient to connect these two groups of words, i.e., a first group of synonyms and a second group of synonyms which are more or less antonyms to the first group of synonyms, as well as to connect the words in each group.

As discussed hitherto, an electronic dictionary is required to be capable of making a search not only within each of plural groups of vocabulary entries, but also across two or more separate groups of entries. In other words, it is relatively frequently required to achieve selective connection of a vocabulary entry of one group, to the other words of that one group, or alternatively to vocabulary entries of another group.

SUMMARY OF THE INVENTION

It is accordingly a primary object of the present invention to provide an electronic dictionary which is capable of satisfying the requirements indicated above.

The above object is attained according to the invention which provides an electronic dictionary, comprising a dictionary memory, input means, search means, first retrieval means, second retrieval means, display means and group-linking means.

The dictionary memory of the instant electronic dictionary has a multiplicity of data memory locations identified by respective numbered addresses. Each of the data memory locations comprises a vocabulary-data memory location and an address-number memory location which correspond to each other. The vocabulary-data memory locations store vocabulary data representative of different vocabulary entries which include plural groups of vocabulary entries. Each of the plural groups consists of the vocabulary entries of the same nature which include at least one special vocabulary entry. The vocabulary entries of each group are retrieved in a predetermined order. Each of the address-number memory locations which correspond to the vocabulary entries of each group except the at least one special vocabulary entry, stores address-number data representative of the address of the vocabulary-data memory location at which is stored the vocabulary data representative of the vocabulary entry which is retrieved next. The address-number memory location which corresponds to the vocabulary-data memory location which stores the at least one special vocabulary entry, stores special data.

The input means designates a desired one of the different vocabulary entries, and the search means searches the vocabulary-data memory location at which the vocabulary entry designated by the input means is stored.

The first retrieval means retrieves the address-number data or the special data stored in the address-number memory location which corresponds to the vocabulary-data memory location which has been searched by the search means. If the address-number data is retrieved by the first retrieval means, the second retrieval means retrieves the vocabulary data stored in the vocabulary-data memory location which is designated by the retrieved address-number data. The first retrieval means also retrieves the data stored in the address-number memory location which corresponds to the vocabulary data which has been retrieved by the second retrieval means.

The display means indicates the vocabulary entry which has been retrieved by the second retrieval means. If the special data is retrieved by the first retrieval means, the group-linking means links the currently retrieved group of vocabulary entries, with another group by designating an address of a vocabulary entry of said another group based on the special data which has been retrieved by the first retrieval means, and by causing the second retrieval means to retrieve the vocabulary data stored in the vocabulary-data memory location at the designated address.

Another object of the invention is to provide an electronic dictionary which is adapted to accept an expansion-dictionary memory in addition to a basic-dictionary memory, and wherein at least one group of vocabulary entries of the same nature in the basic-dictionary memory may be connected, in a loop, to at least one group of vocabulary entries of the same nature in the expansion-dictionary memory.

This object is attained by an arrangement wherein the dictionary memory comprises a basic-dictionary memory which stores at least one of the plural groups of vocabulary entries, and further comprises at least one expansion-dictionary memory which stores at least one of the plural groups which is different from the at least one group stored in the basic-dictionary memory. The at least one group of vocabulary entries stored in the basic-dictionary memory is linked with the at least one group stored in the at least one expansion-dictionary memory by the group linking means.

In the case where the plural groups of vocabulary entries of the same nature are plural synonym groups each of which consists of vocabulary entries synonymous with each other, it is possible to make a search for synonyms of a word across the basic- and expansion-dictionary memories.

In an advantageous embodiment of the invention, the special vocabulary entry is adapted to be retrieved last in each group of vocabulary entries, and the special data comprises start-address data and end data. The start-address data is representative of the address of the vocabulary data of each group which is to be retrieved first. The end data indicates that the special vocabulary entry of each group is to be retrieved last. In this embodiment, the dictionary memory comprises one expansion-dictionary memory, and the group-linking means comprises start-address memory which stores the start-address data of the at least one group of vocabulary entries in the basic-dictionary memory, and further stores the start-address data of the at least one group in the expansion-dictionary memory, in corresponding relation with each other. The group-linking means comprises checking and processing means which checks whether the expansion-dictionary memory is installed in place or not. If the expansion-dictionary memory is not installed in place, the group-linking means causes the second retrieval means to retrieve the vocabulary data of the basic-dictionary memory designated by the start-address data which has been retrieved by the first retrieval means together with the end data. On the other hand, if the expansion-dictionary memory is installed in place, the group-linking means causes the second retrieval means to retrieve the vocabulary data which is designated by the start-address data which is stored in the start-address memory in corresponding relation with the start-address data retrieved by the first retrieval means.

In one preferred form of the above embodiment, the expansion-dictionary memory includes memory locations which constitute the start-address memory.

According to another advantageous embodiment of the invention, the dictionary memory comprises plural expansion-dictionary memories, and the special vocabulary entry is adapted to be retrieved last in each group. The special data of each group of the basic-dictionary memory comprises first start-address data and first end data. The first start-address data is representative of the address of the vocabulary data of each group of the basic-dictionary memory which is to be retrieved first. The first end data indicates that the special vocabulary entry of each group of the basic-dictionary memory is to be retrieved last. The special data of each group of each of the plural expansion-dictionary memories comprises first start-address data and second end data. The second end data indicates that the special vocabulary entry of each group of each expansion-dictionary memory is to be retrieved last. The first end data, the second end data in one of the plural expansion-dictionary memory and the second end data in the other expansion-dictionary memory or memories are different from each other. Each of the end data designates the dictionary memory which stores the vocabulary entry that is to be retrieved next to the vocabulary entry corresponding to each end data. The group-linking means comprises plural start-address memories corresponding to the plural expansion-dictionary memories, each of the plural start-address memories stores the first start-address data and the corresponding second start-address data of the expansion-dictionary memory. The second start-address data is representative of the address of the vocabulary data of each group of each expansion-dictionary memory which is to be retrieved first. The group-linking means further comprises checking and processing means which checks whether the expansion-dictionary memory designated by the retrieved end data is installed in place or not. If the designated expansion-dictionary memory is not installed in place, the group-linking means causes the second retrieval means to retrieve the vocabulary data of the basic-dictionary memory designated by the first start-address data which has been retrieved together with the end data by the first retrieval means. If the designated expansion-dictionary memory is installed in place, the group-linking means causes the second retrieval means to retrieve the vocabulary data of the installed expansion-dictionary memory which is designated by the second start-address data which is stored in the start address memory in corresponding relation with the first start-address data retrieved by the first retrieval means.

According to a further advantageous embodiment of the invention, the special vocabulary entry is adapted to be retrieved last in each group, and the special data comprises first start-address data and second start-address data in corresponding relation with each other. The first start-address data is representative of the address of the vocabulary data of each group of the basic-dictionary memory which is to be retrieved first. The second start-address data is representative of the address of the vocabulary data of each group of each of the at least one expansion-dictionary memory which is to be retrieved first. The group-linking means comprises checking and processing means which checks whether the expansion-dictionary memory which is to be retrieved next to the currently retrieved dictionary memory is installed in place or not. If the expansion-dictionary memory which is to be retrieved next is not installed in place, the checking and processing means causes the second retrieval means to retrieve the vocabulary data of the basic-dictionary memory designated by the first start-address data which has been retrieved by the first retrieval means. If the expansion-dictionary memory which is to be retrieved next is installed in place, the checking and processing means causes the second retrieval means to retrieve the vocabulary data of the installed expansion-dictionary memory which is designated by the second start-address data which has been retrieved by the first retrieval means.

In accordance with a still further advantageous embodiment of the invention, the special data comprises end data which is indicative of each of said plural groups of vocabularly entries, and the group-linking means comprises data-conversion memory means which stores first start-address data and second start-address data in corresponding relation with the end data of the plural groups of vocabulary entries. The first start-address data is representative of the address of the vocabulary data of each group of the basic-dictionary memory which is to be retrieved first, and the second start-address data is representative of the address of the vocabulary data of each group of each of the at least one expansion-dictionary memory which is to be retrieved. The group-linking means comprises checking and processing means which checks whether the expansion-dictionary memory which is to be retrieved next to the currently retrieved dictionary memory is installed in place or not. If the expansion-dictionary memory which is to be retrieved next is not installed in place, the checking and processing means causes the second retrieval means to retrieve the vocabulary data of the basic-dictionary memory designated by the first start-address data which has been retrieved by the first retrieval means. If the expansion-dictionary memory which is to be retrieved next is installed in place, the checking and processing means causes the second retrieval means to retrieve the vacabulary data of the installed expansion-dictionary memory which is designated by the second start-address data which has been retrieved by the first retrieval means.

In one form of the above embodiment, the checking and processing means selects one of the first and second start-address data in the data-conversion memory and transfers the selected first or second start-address data to a working memory, upon application of power to the electronic dictionary, according to the installation of each expansion-dictionary memory. The checking and processing means retrieving the selected first or second start-address data from the working memory when the end data is retrieved by the first retrieval means.

In accordance with a still further advantageous embodiment of the invention, the group-linking means may comprise linking-data memory means which stores large-loop linking data for connecting the vocabulary entries of each group in the basic-dictionary memory to the vocabulary entries of the at least one expansion-dictionary memory. The linking-data memory means further stores small-loop linking data for connecting the vocabulary entries of each group in the basic-dictionary memory. The large-loop linking data and the small-loop linking data are stored in the linking-data memory means in corresponding relation with the special data. The group-linking means further comprises checking and processing means which checks whether the at least one expansion-dictionary memory is installed in place or not, and selects the small-loop linking data if the at least one expansion-dictionary memory is not installed in place. If any of the at least one expansion-dictionary memory is installed in place, the checking and processing means selects the large-loop linking data.

A further object of the present invention is to provide an electronic dictionary wherein synonyms of a vocabulary entry which belongs to plural groups of synonyms can be retrieved in a systematic manner to find the desired synonym of that vocabulary entry from among the plural groups of synonymous entries.

The above object of the invention may be fulfilled by another advantageous embodiment of the invention wherein the different vocabulary entries include a group-linking term which belongs to one of the plural groups and to another of the plural groups. The above-indicated one group consists of vocabulary entries which are synonymous with one of plural meanings of the group-linking term, and the above-indicated another group consists of vocabulary entries which are synonymous with another meaning of the group-linking term. The group-linking term serves as the special vocabulary entry common to said one and another groups, and the group-linking means links said one and another groups at the group-linking term.

According to one form of the above embodiment, the special data comprises first and second start-address data which represent the addresses of the vocabulary entries which are to be retrieved first in said one and another groups, respectively. The group-linking means comprises selector means for selecting one of the first and second start-address data. In this instance, each of the address-number memory locations stores, in addition to the address-number data or special data, group-identification data representative of the group to which the vocabulary entry in the vocabulary-data memory location corresponding to each address-number memory location belongs. The group-linking means selects one of the first and second start-address data, based upon the group-identification data.

According to another form of the above embodiment, the display means indicates, in addition to the vocabulary entry which has been retrieved by the second retrieval means, a group-identification symbol which represents one of said one and another groups to which the indicated vocabulary entry belongs.

The above-indicated object may also be attained by a yet further advantageous embodiment of the invention wherein the different vocabulary entries represented by the individual vocabulary data include a group-linking term which belongs to one of the plural groups and to another of the plural groups. The one group consists of vocabulary entries which are synonymous with one of plural meanings of the group-linking term, and the another group consists of vocabulary entries which are synonymous with another meaning of the group-linking term. The group-linking term serves as the special vocabulary entry common to the one and another groups. Each of the address-number memory locations stores, in addition to the address-number data or the special data, group-identification data representative of the group to which the vocabulary entry in the vocabulary-data memory location corresponding to each address-number memory location belongs. The group-linking means selects the vocabulary entry which is retrieved following the group-linking term, based on the group-identification data when the special data is retrieved by the first retrieval means.

BRIEF DESCRIPTION OF THE DRAWING

The above and other objects, features and advantages of the present invention will become more apparent from reading the following description of the preferred embodiments taken in connection with the accompanying drawing in which:

FIG. 4 is a perspective view of an electronically operated typewriter equipped with an electronic dictionary of the invention;

FIGS. 10, 11A and 11B are diagrammatic flow charts showing events of operation controlled by a central processing unit of the control system;

FIGS. 15A and 15B are flow charts illustrating the operation of the embodiment of FIGS. 13 and 14;

FIGS. 20, 21A and 21B are flow charts showing the operation of the embodiment of FIGS. 16–19;

FIGS. 26A and 26B are flow charts illustrating the operation of the embodiment of FIGS. 24 and 25.

DETAILED DESCRIPTION OF THE PREFERRED EMBODIMENTS

Figure 1:
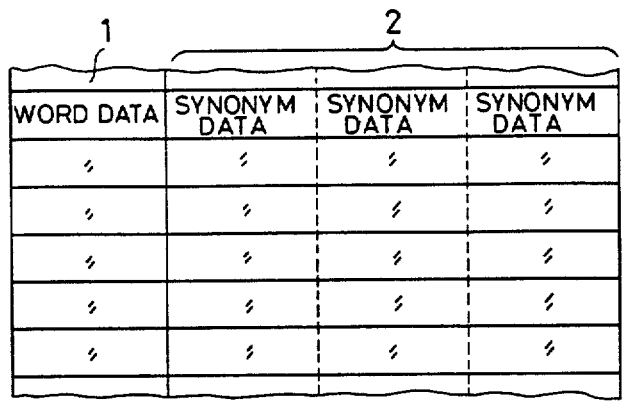
FIG. 1 is a diagram showing data memory locations of a dictionary memory used in a known electronic dictionary.
Figure 2:
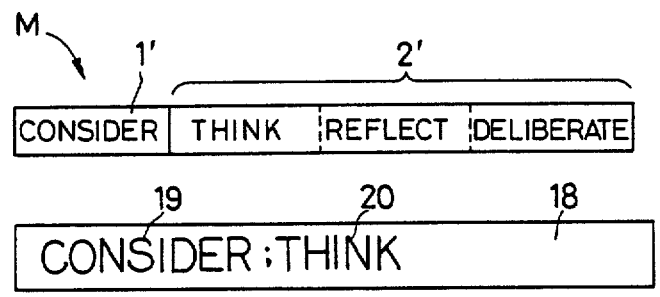
FIG. 2 is a view showing an example of contents of one of the data memory locations of the known dictionary memory of FIG. 1.

Referring to the accompanying drawing, there is shown in FIG. 4 an electronic typewriter generally indicated at 11, which is equipped with an electronic dictionary of the invention. The typewriter 11 includes an input device in the form of an input keyboard 12 which has a right and a left shift key 13, 13, a multiplicity of character keys 14 corresponding to alphabetic letters, numerals and symbols, and a space bar 15. Desired data such as letters (words) and digits (numerical values) are entered through the character keys 14.

Figure 5:
FIG. 5 is an illustration of a display provided on the typewriter of FIG. 4, showing an example of indication on the display.

To the left of the left shift key 13, there are disposed a synonym-call key 16 and a clear key 17. The synonym-call key 16 is operated when it is desired to find a vocabulary entry or entries in the form of a word or a phrase, which is/are synonymous with or allied in meaning to a vocabulary entry (e.g., English word) which is entered through the character keys 14. The clear key 17 is operated when it is desired to cancel an already keyed-in entry (word) and to key in a new entry, more precisely, to replace the already keyed-in characters (not necessarily a word) with a new set of characters, which usually form a word. In a rear central portion of the keyboard 12 is provided display means in the form of a display 18 which is adapted to indicate data keyed in through the character keys 14, for example a word 19 ("CONSIDER") as shown in FIG. 5, and also a synonym 20 ("THINK") of the keyed-in word 19 (a word 20 synonymous with or related in meaning to the keyed-in word 19). Behind the keyboard 12, there is disposed a printing device 21 which is capable of effecting a printing operation on a sheet of paper 22, upon activation of the space bar 15, according to character data which have been entered through the character keys 14 prior to the activation of the space bar 15.

Referring next to FIGS. 6, 7, 8 and 9, there will be described an arrangement of an electric control system of the electronic dictionary incorporated in the typewriter 11 constructed as stated above.

The control sytem comprises a central processing unit 23 (hereinafter simply called "CPU 23") which includes search means, first retrieval means, second retrieval means, and group-linking means, which will be described. Upon activation of the character keys 14, space bar 15, synonym-call key 16, and other keys on the keyboard 12, the corresponding input signals are transferred to the CPU 23, which responds to these input signals to operate the display 18 and the printing device 21 for indicating the keyed-in words on the display 18 and printing them on the sheet of paper 22.

Figure 7:
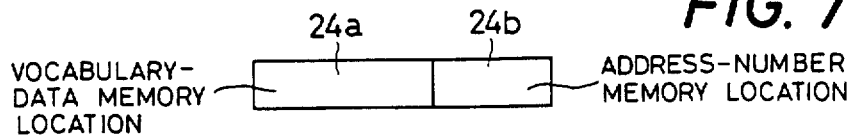
FIG. 7 is a view showing storage sections of a basic-dictionary memory used in the electronic dictionary.
Figure 8:
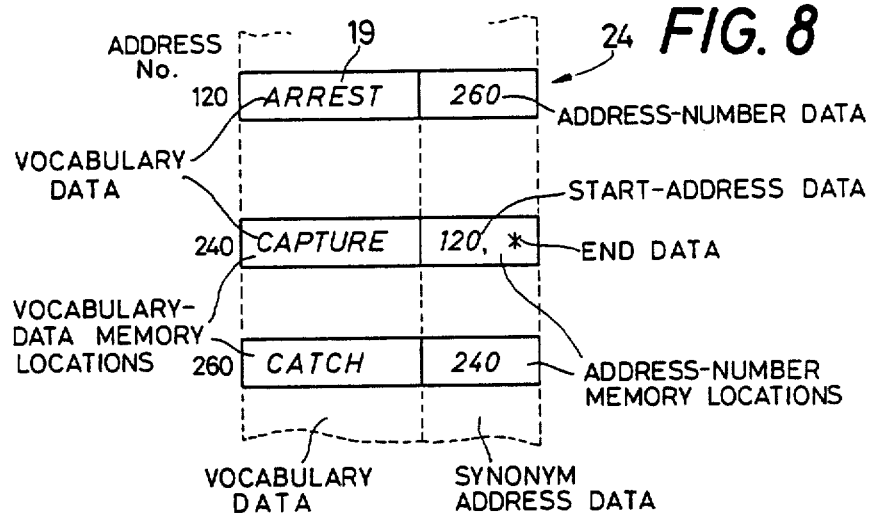
FIG. 8 is a diagrammatic illustration showing examples of contents of several data memory locations of the basic-dictionary memory.

The CPU 23 is connected to a basic-dictionary memory in the form of a first read-only-memory (hereinafter referred to as "first ROM 24") which comprises a vocabulary storage section and a synonym-address storage section. More specifically stated, the first ROM 24 comprises a multiplicity of data memory locations each of which consists of a vocabulary-data memory location 24a, and an address-number memory location 24b, as shown in FIG. 7. The individual data memory locations are identified by respective numbered addresses as shown in FIG. 8. In the vocabulary-data memory location 24a, there is stored a set of vocabulary data which represents a vocabulary entry in the form of a word 19. Thus, the vocabulary-data memory locations 24a of the multiple data memory locations constitute a vocabulary storage section in which multiple different vocabulary entries (mostly in the form of words) are stored in an alphabetical order as indicated in FIG. 8.

The address-number memory location 24b of each data memory location stores a set of address-number data which designates or represents one of the addresses at which is stored a vocabulary entry synonymous with or related in meaning to the vocabulary entry stored in the corresponding vocabulary-data memory location 24a. The address-number memory locations 24b of the multiple data memory locations constitute a synonym-address storage section, which cooperates with the vocabulary storage section to form the basic-dictionary memory 24 (first ROM 24).

Stated more particularly, the vocabulary storage section stores multiple groups of vocabulary entries. The entries of each group are of the same nature in meaning, for example, a group of words which are synonymous with each other. For example, as shown in FIG. 8, a synonym group consists of three different English words: "ARREST", "CAPTURE" and "CATCH" which are stored in the vocabulary-data memory locations 24a at address Nos. 120, 240 and 260. In the address-number memory location 24b corresponding to the vocabulary-data memory location 24a at address No. 120 (at which the vocabulary data "ARREST" is stored), there is stored address-number data "260" which represents address No. 260 at which the vocabulary data "CATCH" is stored. This means that the word "CATCH" is selected as one member of the synonym group, a synonym of the word "ARREST". Similarly, address-number data "240", is stored in the address-number memory location 24b at address No. 260, so as to designate another member "CAPTURE" of the synonym group. Further, in the address-number memory location 24b at address No. 240, address-number data "120" is stored so that the word "ARREST" at address No. 120 is designated as a word synonymous with the word "CAPTURE". In this way, the three vocabulary entries, namely, the words "ARREST", "CATCH" and "CAPTURE" which form a synonym group are connected together in a closed loop wherein the member words are followed by each other in succession, irrespective of the member word which is entered through the character keys 14. These member words of the synonym group are indicated on the display 18 under control of the CPU 23 in a manner as discussed later.

In the above-indicated synonym group of words "ARREST", "CATCH" and "CAPTURE", the word "CAPTURE" is selected as a special vocabulary entry which is adapted to be retrieved last in the group. In the address-number memory location 24b corresponding to the vocabulary-data memory location 24a which stores the special vocabulary entry "CAPTURE", there is stored a special code represented by a symbol "*", in addition to the address-number data "120" which serves to return the synonym search to the address No. 120. The function of the end data "*" will be described later. For convenience, the special code "*" is referred to as "end data" which indicates that the word "CAPTURE" is to be retrieved last of the members of the synonym group, and the address-number data "120" at address No. 240 is referred to as "start-address data" which designates the word "ARREST" which is adapted to be retrieved first in the synonym group. The "start-address data" and the "end data" constitute special data. That is, the "special data" is stored in the address-number memory location 24b at address No. 240 at which the special vocabulary entry is stored.

The CPU 23 is further connected to a working memory in the form of a random-access-memory (hereinafter referred to as "RAM 25") which stores character data entered through the character keys 14, and vocabulary data and address-number data which are retrieved by the CPU 23 from the first ROM 24.

Figure 6:
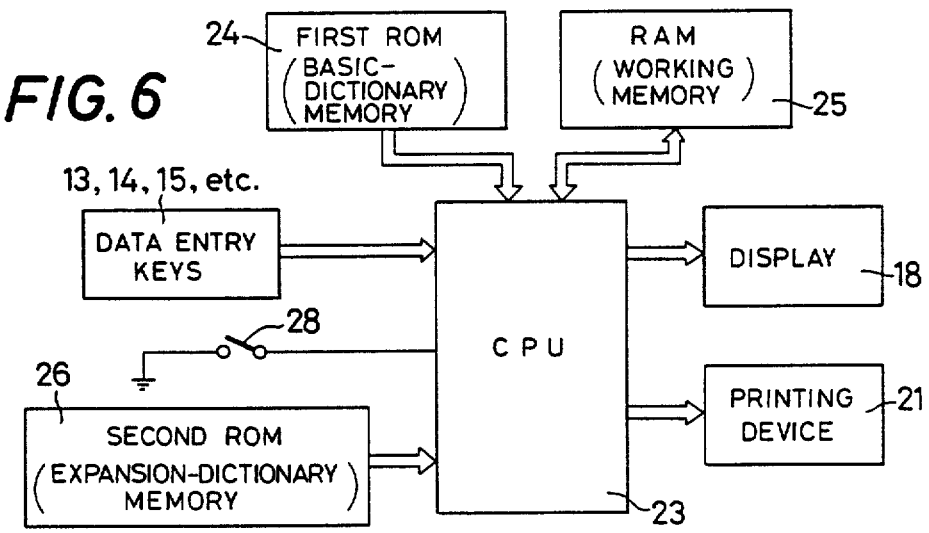
FIG. 6 is a schematic block diagram of an electric control system of the typewriter.
Figure 3:
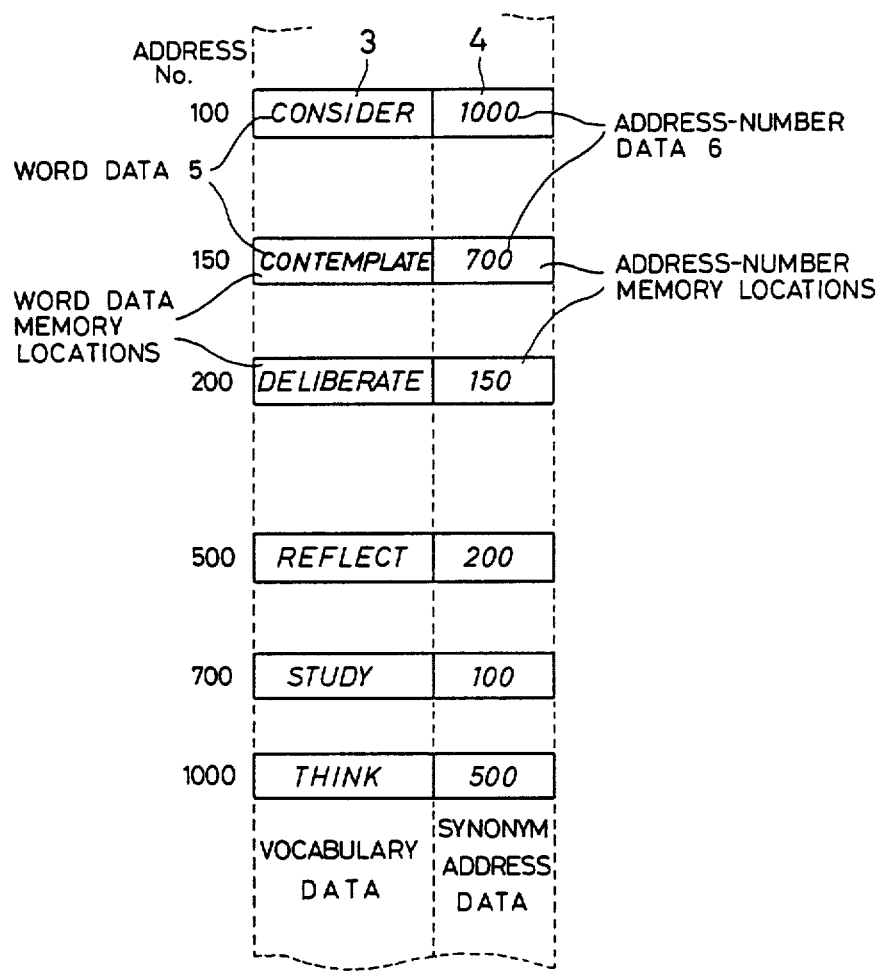
FIG. 3 is a diagrammatic illustration showing several data memory locations of a dictionary memory which was developed by the assignee of this application, and an example of contents of the memory locations.
Figure 9:
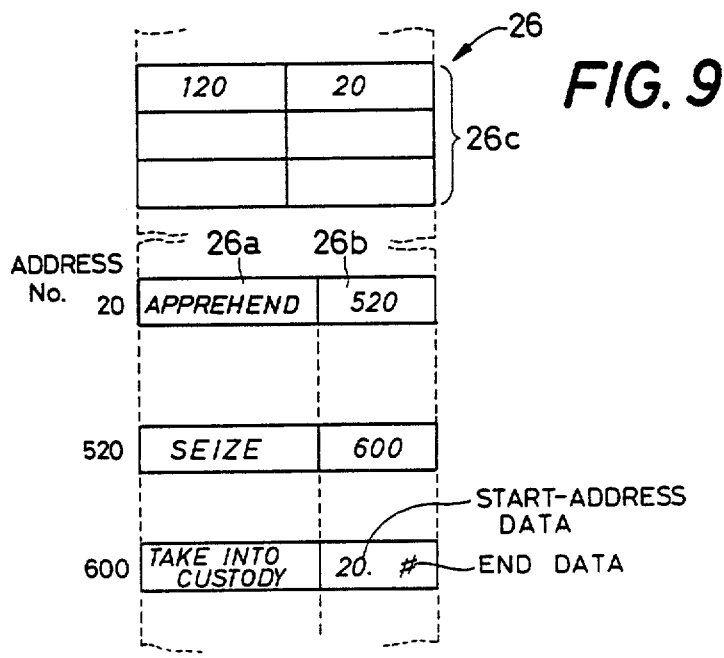
FIG. 9 is a diagrammatic illustration showing examples of contents of some data memory location of an expansion-dictionary memory adapted to be installed on the typewriter.

The CPU 23 is also connected to an expansion-dictionary memory in the form of a second read-only-memory 26 (hereinafter called "second ROM 26") as shown in FIG. 6. This second ROM 26 is optionally installed in an expansion ROM-module receptacle 27 to expand the capacity of the dictionary memory. Like the first ROM 24, the second ROM 26 has a multiplicity of data memory locations each comprising a vocabulary-data memory location 26a and an address-number memory location 26b, as shown in FIG. 9. The vocabulary-data memory locations 26a stores vocabulary data representative of vocabulary entries which are not covered by the basic-dictionary memory (first ROM 24). The vocabulary entries are stored in the vocabulary-data memory locations 26a in an alphabetical order as indicated in FIG. 9.

Like the address-number memory location 24b, the address-number memory location 26b stores a set of address-number data which designates or represents one of the addresses at which is stored a vocabulary entry synonymous with or related in meaning to the vocabulary entry stored in the corresponding vocabulary-data memory location 26a.

The vocabulary storage section of this second ROM 26 stores multiple groups of vocabulary entries, the entries of each group being of the same nature in meaning, for example, a group of words which are synonymous with each other. In an example of FIG. 9, a synonym group consists of three different vocabulary entries, i.e., two words "APPREHEND" and "SEIZE" and one phrase "TAKE INTO CUSTODY", which are stored in the vocabulary-data memory locations 26a at address Nos. 20, 520 and 600. In the address-number memory location 26b corresponding to the vocabulary-data memory location 26a at address No. 20 (at which the vocabulary data "APPREHEND" is stored), there is stored address-number data "520" which represents address No. 520 at which the vocabulary data "SEIZE" is stored. This means that the word "SEIZE" is selected as one member of the synonym group, a synonym of the word "APPREHEND". Similarly, address-number data "600", is stored in the address-number memory location 26b at address No. 520, so as to designate another member "TAKE INTO CUSTODY" of the synonym group. In this example, the vocabulary entry "TAKE INTO CUSTODY" is selected as a special vocabulary entry which is to be retrieved last in the synonym group. Therefore, the address-number memory location 26b at address No. 600 stores special data which consists of start-address data "20" which designates the first member "APPREHEND" of the synonym group, and end data represented by a symbol "#" which indicates that the "TAKE" INTO CUSTODY" is the special vocabulary entry of the synonym group. In this way, the three vocabulary entries "APPREHEND", "SEIZE" and "TAKE INTO CUSTODY" of the synonym group are connected together in a loop wherein the member synonyms are followed by each other in succession.

As indicated above, a group of vocabulary entries of the same nature may include phrases such as "TAKE INTO CUSTODY", as well as words.

The second ROM 26 further comprises a start-address memory 26c consisting of data memory locations each of which stores first and second start-address data for linking two synonym groups, one in the basic-dictionary memory (first ROM 24) and the other in the expansion-dictionary memory (second ROM 26), so that the vocabulary entries of the two groups may be connected in a continuous group. The number of the data memory locations of the start-address memory 26c corresponds to the number of group-to-group connections between the first and second ROMs 24, 26. Described in greater detail referring to FIGS. 8 and 9, the synonym group including the word "ARREST" in the first ROM 24, and the synonym group including the word "APPREHEND", are linked with each other by means of a pair of first start-address data "120" and second start-address data "20" which are stored in the start-address memory 26c, in corresponding relation with each other. In this connection, it will be understood that the first start-address data stored in the memory 26c is the same as the start-address data "120" of the special data which is stored in the address-number memory location 24b of the first ROM 24 corresponding to the special vocabulary entry "CAPATURE" at address No. 240. It will be further understood that the second start-address data "20" stored in the memory 26c is the same as the start-address data which represents the address of the vocabulary entry "APPREHEND" of the synonym group in the second ROM 26, which is to be retrieved first.

The CPU 23 serves as means for checking whether the second ROM 26 (expansion-dictionary memory 26) is installed in place or not, that is, whether the second ROM 26 is plugged in the expansion ROM-module receptacle 27 of the typewriter 11. More specifically, a detector switch 28 is connected to the CPU 23 as shown in FIG. 6. The detector switch 28 is disposed so that it generates an ON signal while the second ROM 26 is plugged in place in the expansion ROM-module receptacle 27. The CPU 23, which is responsive to the ON signal, judges that the second ROM 26 is installed. If the second ROM 26 is not installed in place, the CPU 23 operates so that vocabulary entries of each synonym group in the first ROM 24 (basic-dictionary memory) may be retrieved in a loop in the predetermined order as described previously. The retrieved synonyms are displayed on the display 18. If the second ROM 26 (expansion-dictionary memory) is installed, the CPU 23 operates so that synonyms of a vocabulary entry which belongs to a synonym group in the first or second ROM 24, 26 may be retrieved from both the first ROM 24 and the second ROM 26. That is, two groups of vocabulary entries one in the first ROM 24 and the other in the second ROM 26 are connected in a large loop across the two memories 24 and 26.

The operation of the electronic dictionary of the typewriter 11 with the above arrangement will be described referring to flow charts of FIGS. 10, 11A and 11B which show events of operations controlled by the CPU 23. For easy understanding, step numbers (numbers followed by letter S) are given in these figures and inserted in parenthesis in the following description.

After application of power to the typewriter 11, the CPU 23 are ready to accept input data which are entered through the keyboard 12, i.e., ready to accept character data which is entered through the character keys 16 (S1). If the operator desires to enter a word "ARREST", the character key 14 corresponding to letter "A" is first pressed. The CPU 23 transfers the character data "A" into the RAM 25 (S2), and directs the display 18 to indicate the character "A" based on the character data "A" stored in the RAM 25 (S3).

Then, the CPU 23 checks to see if the synonym-call key 16, any character key 14, space bar 15 or clear key 17 has been activated (S4–S7). When the operator depresses the character key 14 corresponding to letter "R", the CPU 23 goes to step S2 wherein the character data "R" is stored in the RAM 25. Successively, the character "R" is indicated to the right of the character "A" already indicated on the display 18 (S3). In the similar manner, the character keys 14 corresponding to the remaining letters "R", "E", "S" and "T" of the word "ARREST" are operated, and the corresponding character data are stored in the RAM 25. As a result, the word "ARREST" is indicated on the display 18.

If it is desired to change a word already entered through the character keys 14, or to correct a misspelled word, the clear key 17 is operated. In this instance, the RAM 25 and the display 18 are cleared (S8), and the CPU 23 goes to step S1 and waits for entry of another or correct word. When the operator wants to print a word, for example, "ARREST" already entered through the character keys 14, the space bar 15 is operated. Upon activation of the space bar 15, the CPU 23 operates the printing device 21 according to the character data stored in the RAM 25, whereby the word "AR- REST" is printed (S9). Subsequently, the CPU 23 clears the RAM 25 and the display 18 (S10), and goes back to step S1 for entry of another word.

When the operator presses the synonym-call key 16 to find a synonym or synonyms of the word "AR-REST", the CPU 23 initiates a searching operation (S11–S15) in response to a signal from the synonym-call key 16, to scan the first ROM 24, and the second ROM 26 if installed in position, in order to retrieve the vocabulary data which represents the word "ARREST" whose six sets of character data are stored in the RAM 25. In other words, the CPU 23 scans the vocabulary-data memory locations 24a (S11) of the first ROM 24 to check if any one of the memory locations 24a stores the vocabulary data which represents a combination of six letters "ARREST". If the vocabulary data "ARREST" is not found in the first ROM 24 (S12), the CPU 23 then checks if the second ROM 26 is installed in place or not (S13). In the case where the second ROM 26 is installed in place, the CPU 23 scans the vocabulary-data memory locations 26a of the second ROM 26 to find the vocabulary data "ARREST" (S14).

When the vocabulary data representing the word "ARREST" has been searched or found in the first ROM 24 or in the second ROM 26 (in the first ROM 24 in this specific example), the CPU 23 retrieves the address-number data or special data stored in the address-number memory location 24b corresponding to the vocabulary-data memory location 24a at which the vocabulary data "ARREST" is stored (S16). In this specific example, the address-number data "260" at address No. 120 is retrieved.

Successively, the CPU 23 checks whether the retrieved data ("∓260") is the previously indicated special data, or not (S17). In the instant example, the retrieved data "260" does not include end data, that is, the retrieved address-number data is not special data. However, if special data is stored, the CPU 23 checks if the special data is stored in the address-number memory location 24b of the first ROM 24, i.e., if the keyed-in vocabulary entry is stored in the first ROM 24 or not (S18). In the case where the special data is stored in the first ROM 24, the CPU 23 goes to step S19 to transfer to the RAM 25 vocabulary data and address-number data which are stored in data memory location of the second ROM 26 which is designated by the second start-address data in the appropriate memory location of the start-address memory 26c of the second ROM 26, if the second ROM 26 is installed. However, if the second ROM 26 is not installed, the CPU 23 transfers to the RAM 25, in step S19, vocabulary data and address-number data which are stored in data memory location of the first ROM 24 designated by the first start-address data in the start-address memory 26c, i.e., designated by the start-address data of the special data.

On the other hand, if the special data is stored in the address-number memory location 26b of the second ROM 26, the CPU 23 transfers to the RAM 25 vocabulary data and address-number data which are stored in data memory location of the first ROM 24 which is designated by the first start-address data in the appropriate memory location of the start-address memory 26c of the second ROM 26 (S20). It will be understood that these steps S18–S20 are executed also when the special data (start-address data and end data) is stored in the address-number memory location corresponding to the vocabulary-data memory location at which the keyed-in vocabulary entry is stored.

In the present example wherein the word "ARREST" is entered through the keyboard 12, however, the data "260" stored in the address-number location 24b at address No. 120 is not special data, and therefore the result of checking in step S17 is negative, whereby the CPU 23 goes to step S21, which will be described later.

In the event that no vocabulary data representing the word "ARREST" is found in the first ROM 24 or in the second ROM 26, the CPU 23 directs the display 18 to provides a message that the vocabulary data corresponding to the keyed-in entry "ARREST" is not present in the first and second ROMs 24, 26 (S22). Then, the CPU 23 goes to steps S4–S7, and waits for the activation of the clear key 17 (S7). Upon activation of the clear key 17, the CPU 23 clears the RAM 25 and the display 18 (S8), and goes back to step S1.

Referring back to step S21, the CPU 23 retrieves the vocabulary data "CATCH" and the address-number data "240" stored in the vocabulary-data and address-number memory locations 24a and 24b at address No. 260 which is represented by the retrieved address-number data "260", and the CPU 23 stores these data "CATCH" and "240" in the RAM 25. Based on the stored vocabulary data "CATCH", the CPU 23 directs the display 18 to indicate the corresponding word "CATCH" to the right of the already displayed word "ARREST" 19, to present the word "CATCH" as a synonym 20 of the word "ARREST" (S23). Thus, the operator may know one of synonyms of the word which has been keyed in through the input keyboard 12.

After the word "CATCH" has been indicated on the display 18 as one of the synonyms 20 of the word "ARREST", the CPU 23 becomes ready to accept a signal from the synonym-call key 16, space bar 15 or clear key 17 (S24, S33, S36). If the operator presses the synonym-call key 16 to try to find another synonym of the word "ARREST" (S24), the CPU 23 removes the current indication of the synonym 20, i.e., the word "CATCH" from the display 18 (S25). In this condition, the keyed-in word "ARREST" remains indicated on the display 18. Then, the CPU 23 retrieves the address-number data "240" which has previously been transferred to the RAM 25 from the address-number memory location 24b at address No. 260 (S26). In the next step (S27), the CPU 23 checks if the retrieved data is special data or not. Since the retrieved address-number data "240" is not special data, the CPU 23 goes to step S28 similar to step S21, whereby the vocabulary data "CAPTURE" and special data "120, *" ae transferred to the RAM 25. Then, the word "CAPATURE" is indicated on the display 18 as another synonym of the word "ARREST" (S29).

If the operator presses the synonym-call key 16 again to find a further synonym of the word "ARREST" (S24), the CPU 23 goes to step S25, and then to step S26 wherein the special data "120, *" is retrieved from the RAM 25. In the next step S27, the CPU 23 checks if the retrieved data "120, *" is special data or not. Since the data "120, *" is special data, the CPU 23 goes to step S30 similar to step S18. Since the special data "120, *" is stored in the address-data memory location 24b of the first ROM 24, step S30 is followed by step S31 similar to Step S19. More particulary, in step S31, the CPU 23 scans the start-address memory 26c to search for the first start-address data "120" which corresponds to the start-address data "120" of the retrieved special data "120, *". Then, the CPU 23 retrieves from the second start-address data "20" which corresponds to the searched first start-address data "120". The CPU 23, then, transfers to the RAM 25 vocabulary data "APPREHEND" and address-number data "520" which are stored in the vocabulary-data memory location 26a and address-number memory location 26b of the second ROM 26 at address No. 20 designated by the second start-address data "20" which has been retrieved from the start-address memory 26c. The vocabulary data "APPREHEND" is then indicated on the display 18 to the right of the word "ARREST" as another synonym (S29).

If the operator wishes to find a still further synonym of the word "ARREST", the synonym-call key 16 is pressed again (S24). The word "APPREHEND" on the display 18 is cleared (S25), and vocabulary data "SEIZE" and address-number data "600" at address No. 520 are transferred to the RAM 25, based on the address-number data "520" which has been stored in the RAM 25, (S26, S27, S28). The word "SEIZE" is indicated on the display 18 as a synonym of the word "ARREST" (S29).

A further synonym of the word "ARREST" may be found by pressing the synonym-call key 16 (S24). In this case, the CPU 23 clears the indication of the word "SEIZE" on the display 18 (S25), and retrieves the address-number data "600" from the RAM 25 (S26). Successively, the CPU 23 goes to steps S27, S28 and S29 to transfer to the RAM 25 vocabulary data "TAKE INTO CUSTODY" and special data "20, #" which are stored at address No. 600 of the second ROM 26, and to indicate the vocabulary entry "TAKE INTO CUSTODY" on the display 18.

If the synonym-call key 16 is activated in this condition (S24), the special data "20, #" is retrieved from the RAM 25 (S26). As a result, the checking in step S27 becomes affirmative, and the CPU 23 goes to step S30 to check if the special data "20, #" is in the address-number memory location 24b of the first ROM 24. Since this special data is in the second ROM 26, the CPU 23 goes to step S32 similar to step S20. Described in more detail, the CPU 23 scans the start-address memory 26c to search for the second start-address data "20" which corresponds to the retrieved special data "20, #". Then, the CPU 23 retrieves the first start-address data "120" which corresponds to the searched second start-address data "20". Based on this first start-address data "120", the CPU 23 designates the address No. 120 of the first ROM 24, and transfers to the RAM 25 the vocabulary data "ARREST" and address-number data "260" which are stored in the vocablary-data memory location 24a address-number memory location 24b of the first ROM 24. Subsequently in step S29, the word "ARREST" is indicated on the display 18 as a synonym 20 of the keyed-in word "ARREST" 19. In this instance, the indicated synonym 20 is the same as the keyed-in word "ARREST" 19.

As discussed above, the repeated operations of the synonym-call key 16 permits sequential indication of the vocabulary entries "ARREST", "CATCH", "CAPTURE", "APPREHEND", "SEIZE", "TAKE INTO CUSTODY" and "ARREST", on the display 18 as synonyms 20 of the keyed-in word 19 "ARREST". If the synonym-call key 16 is activated while the word "ARREST" is indicated as a synonym 20 of the keyed-in word 19 "ARREST", the word "CATCH" is indicated as a synonym 20. The following successive activations of the key 16 will cause the indication of the remaining synonyms 20 of the keyed-in word "ARREST", in the same manner as described hitherto. While the word "ARREST" is keyed in through the keyboard 12 in the foregoing illustrated embodiment, it is possible to key in any one of the six vocabulary entries of the two synonym groups. Accordingly, the vocabulary entries "ARREST", "CATCH", "CAPTURE", "APPREHEND", "SEIZE" and "TAKE INTO CUSTODY" may be indicated as vocabulary entries which are synonymous with each other.

It will be understood from the foregoing description, the illustrated embodiment of the invention is capable of indicating a relatively large number of synonyms 20 of a keyed-in vocabulary 19, which are stored not only in the basic-dictionary memory (first ROM 24) but also in the expansion-dictionary memory (second ROM 26), by repeatedly operating the synonym-call key 16. The synonyms 20 are indicated one after another, one at a time, in such manner that the two groups of synonyms, one in the first ROM 24 and the other in the second ROM 26, are connected in a loop. Moreover, each data memory location of each ROM 24, 26 has only one address-number memory location 24b, 26b other than the vocabulary-data memory location 24a, 26a. This arrangement requires less storage capacity of the first and second ROMs 24, 26, as compared with the conventional arrangement wherein each data memory location has plural synonym-data memory locations other than a word-data memory location.

If the operator wishes to print the word "SEIZE" on the sheet 22 as the best word to express the meaning generally expressed by the keyed-in word "ARREST", the operator depresses the space bar 15, and the CPU 23 activates the printing device 21 to effect a printing operation according to the vocabulary data "SEIZE" currently stored in the RAM 25 (S33–S34). Then, the vocabulary data "SEIZE" in the RAM 25 is cleared, and the indication of the word "SEIZE" on the display 18 is removed (S35). The CPU 23 then goes back to step S1, whereby the operator may continue a printing operation.

In the case where the operator wishes to enter a new word without printing any indicated synonym 20, the clear key 17 is operated (S36). In this instance, the CPU 23 clears the vocabulary data stored in the RAM 25, and removes the current indication of a synonym on the display 18 (S37). Then, the CPU 23 goes back to step S1. Thus, the operator may enter a desired word for printing thereof or finding another word from among a group or groups of synonyms stored in the first and/or second ROMs 24, 26.

Figure 12:
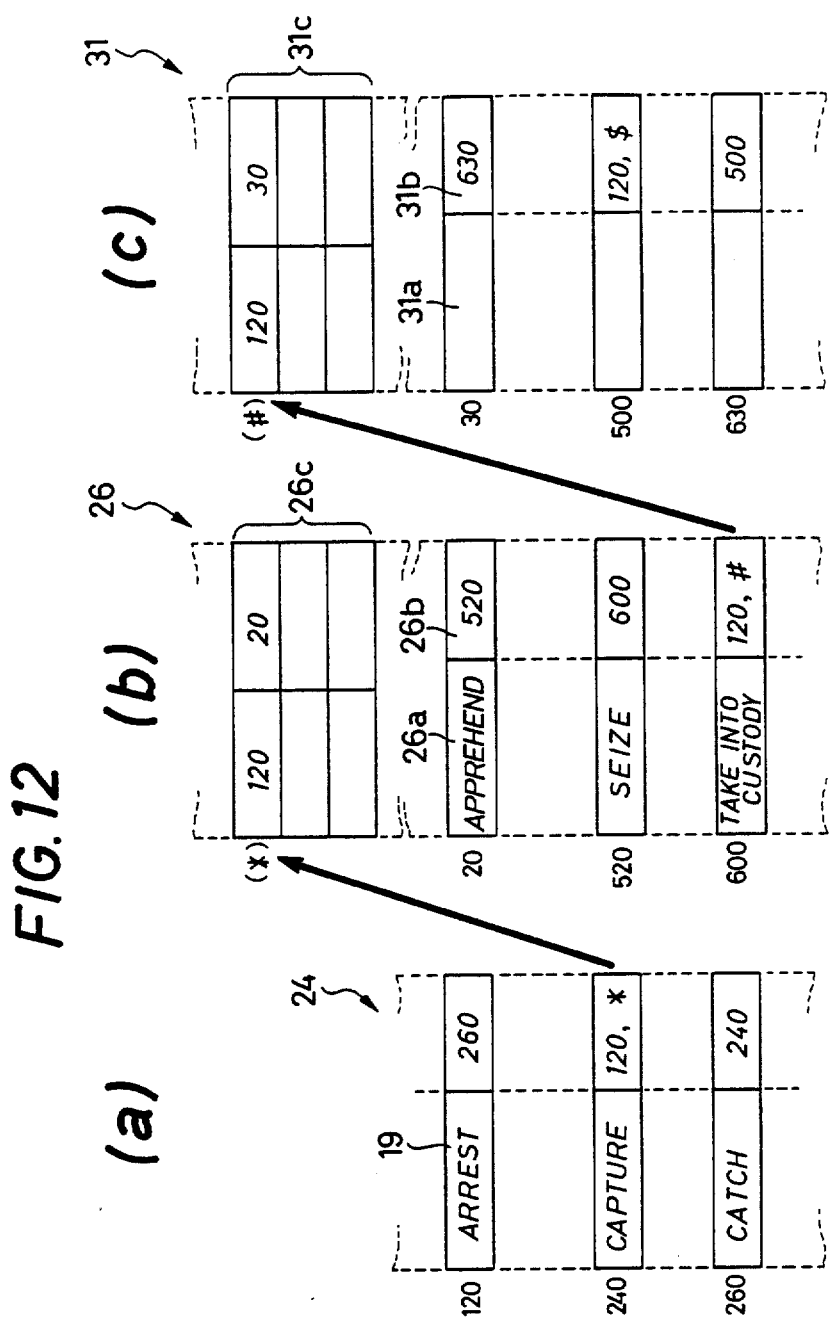
FIG. 12 is a diagrammatic illustration showing a modified form of the invention.

Although the foregoing illustrated embodiment uses only one expansion-dictionary memory (second ROM 26), it is appreciated to use two or more expansion-dictionary memories, as indicated in FIG. 12 which illustrates, at (a), (b) and (c), respectively, the first ROM 24 as the basic-dictionary memory, the second ROM 26 as a first-expansion memory, and a third ROM 31 as a second-expansion memory. Like the second ROM 26, the third ROM 31 has a start-address memory 31c. Each memory location of the start-address memories 26c and 31c of the second and third ROMs 26, 31 consists of a first start-address data and a second start-address data. As in the preceding embodiment of FIGS. 8 and 9, the first start-address data stored in the start-address memory 26c is the start-address data of the special data which is stored at the address of the first ROM 24 at which is stored a special vocabulary entry of each synonym group. Similarly, the first start-address data stored in the start-address memory 31c is the start-address data of the special data which is stored at the address of the second ROM 26 at which is stored a special vocabulary entry.

In the modified arrangement of FIG. 12, however, the address of a vocabulary entry of each synonym group of the first ROM 24 which is to be retrieved first is always used as the start-address data of any special data stored in all of the three ROMs 24, 26 and 31. As shown at (b) in FIG. 12, for example, the special data "120, #" at address No. 600 of the second ROM 26 contains the start-address data "120" which designates address No. 120 of the first ROM 24 at which is stored the vocabulary data "ARREST" which is to be retrieved first in that synonym group. Similarly, the start-address data "120" of the special data "120, $" at address No. 500 of the third ROM 31 also designates the address No. 120 of the first ROM 24. This arrangement is different from the preceding arrangement of FIGS. 8 and 9 wherein the start-address data "20" of the special data "20, #" at address No. 600 of the second ROM 26 does not designate the address No. 120 of the first ROM 24, but designates the address No. 20 of the second ROM 26.

In operation of this modified arrangement, the special vocabulary entry "CAPTURE" at address No. 240 of the first ROM 24 is followed by the vocabulary entry "APPREHEND" at address No. 20 of the second ROM 26 which is designated by the second start-address data "20" which is stored in the start-address memory 26c in corresponding relation with the the first start-address data "120". The special vocabulary entry "TAKE INTO CUSTODY" at address No. 600 of the secodn ROM 26 is followed by a vocabulary entry at address No. 30 of the third ROM 31 which is designated by the second start-address data "30" which is stored in the start-address memory 31c in corresponding relation with the first start-address data "120".

In the third ROM 31, a symbol "$" is used as end data of the special data. If the special data "120, $" at address No. 500 of the third ROM 31 is found, the CPU 23 checks if a third expansion-dictionary (fourth ROM) is installed or not. In this example wherein a fourth ROM is not provided, the CPU 23 designates the first start-address data "120" in the retrieved special data, whereby the word "ARREST" of the first ROM 24 is displayed. In this way, the three synonym groups in the three separate ROMs 24, 26 and 31 are connected in a continuous loop.

Referring to FIGS. 13, 14, 15A and 15B, another embodiment of the invention will be described.

Figure 13:
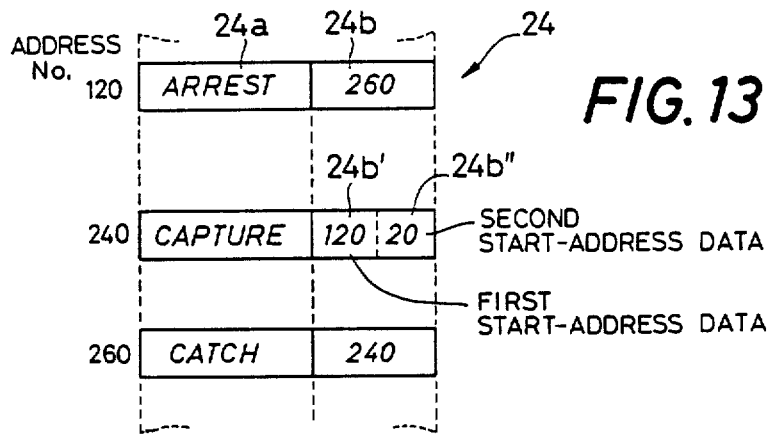
FIGS. 13 and 14 are diagrammatic illustrations showing a modified embodiment of the invention.
Figure 14:
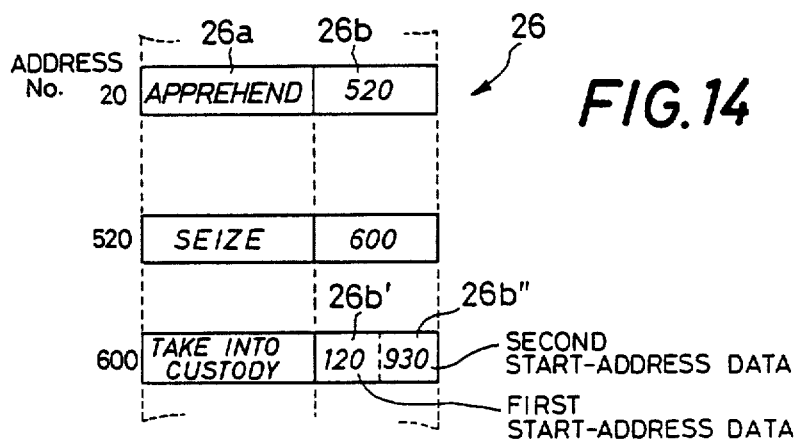

In this embodiment, the second ROM 26 does not have the start-address memory 26c as used in the previous embodiment of FIGS. 8 and 9. Instead, each of the address-number memory locations 24b, 26b corresponding to the vocabulary-data memory locations 24a, 26a which store the special vocabulary entries to be retrieved last in the respective synonym groups of the first and second ROMs 24, 26, consists of a first memory area 24b', 26b' and a second memory area 24b', 26b'', as shown in FIGS. 13 and 14. The first memory area 24b' stores first start-address data which represents the address of a vocabulary entry which is to be retrieved first in the appropriate synonym group in the first ROM 24. In the illustrated example, the first memory area 24b' of the address-number memory location 24b at address No. 240 of the first ROM 24 stores the first start-address data "120" representative of address No. 120 at which is stored the word "ARREST" which is to be retrieved first in the synonym group that includes the special vocabulary entry "CAPATURE". On the other hand, the second memory area 24b'' stores second start-address data which represents the address of a vocabulary entry which is to be retrieved first in a synonym group in the second ROM 26. In the illustrated example, the second memory area 24b'' of the address-number memory location 24b at address No. 240 of the first ROM 24 stores the second start-address data "20" representative of address No. 20 of the second ROM 26 at which is stored the word "APPREHEND" which is to be retrieved first in that synonym group in the second ROM 26. These first and second start-address data constitute special data, which is distinguished from address-number data stored in the address-number memory locations 24b at address Nos. 120 and 260 of the first ROM 24.

The first memory area 26b' of the second ROM 26 stores first start-address data which represents the address of a vocabulary entry which is to be retrieved first in a synonym group in the first ROM 24. In the illustrated example, the first memory area 26b' of the address-number memory location 26b at address No. 600 of the second ROM 26 stores the first start-address data "120" representative of address No. 120 of the first ROM 24 at which is stored the word "ARREST" which is to be retrieved first in that synonym group. On the other hand, the second memory area 26b'' stores second start-address data which represents the address of a vocabulary entry which is to be retrieved first in a synonym group in a third ROM (not shown) serving as a second expansion-dictionary memory. In the illustrated example, the second memory area 26b'' of the address-number memory location 26b at address No. 600 of the second ROM 26 stores the second start-address data "930" representative of address No. 930 of the third ROM at which is stored a first vocabulary entry of the third synonym group of entries which are synonymous with the first and second groups stored in the first and second ROMs 24, 26. These first and second start-address data "120" and "930" constitute special data, which is distinguished from address-number data stored in the address-number memory locations 26b at address Nos. 20 and 520 of the second ROM 26.

In this embodiment, two detector switches 28 are disposed to detect the second ROM 26 and the third ROM (not shown) which are plugged in respective expansion ROM-module receptacles 27.

Figure 15B:
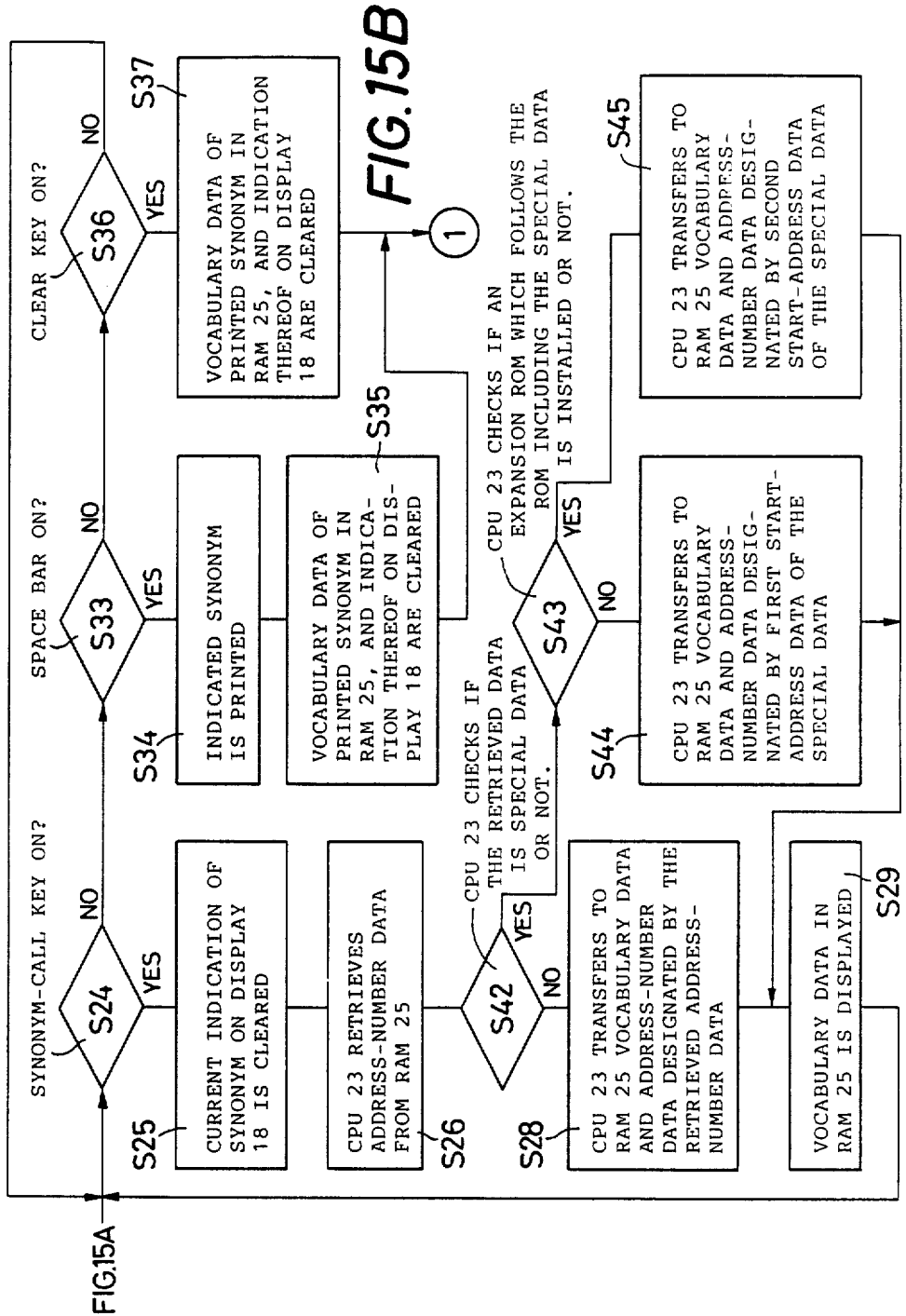

The operation of this modified embodiment of the invention will be described, referring to FIGS. 10, 15A and 15B. In the interest of brevity and simplification, the same step numbers as used in FIGS. 11A and 11B are used in FIGS. 15A and 15B to identify the corresponding steps, and the repeated description of those steps will be limited as much as possible in the interest of brevity and simplification.

In this embodiment, the input, display and printing of a desired vocabulary entry are accomplished in steps S1–S10 as previously described in connection with FIG. 10. When the synonym-call key 16 is pressed after a vocabulary entry "ARREST" has been keyed in through the keyboard 12, steps S11–S16 are executed as previously described with reference to FIG. 11A and as also shown in FIG. 15A, whereby the address "120" of the vocabulary entry "ARREST" is searched and the vocabulary data "ARREST" and address-number data "260" are retrieved from the vacabulary-data memory location 24a and address-number memory location 24b at address No. 120 of the first ROM 24.

Subsequently, the CPU 23 checks in step S38 if the retrieved address-number data "260" is special data consisting of first and second start-address data. In this example, the address-number data "260" is not special data, the CPU 23 goes to step S21 previously described in connection with FIG. 11A. However, if the retrieved data is special data, the CPU 23 goes to step S39 to check if an expansion-dictionary memory (second ROM 26, third ROM, etc.) which follows the basic- or expansion-dictionary memory (first ROM 24, second ROM 26, etc.) including the special data is installed or not. If the expansion-dictionary memory is installed, the CPU 23 goes to step S40 to transfer to the RAM 25 vocabulary data and address-number data which are stored in the data memory location of the expansion-dictionary memory designated by the second start-address data of the special data which is stored in the second memory area (24b'', 26b'', ... ) of the address-number memory location (24b, 26b, ... ).

On the other hand, if an expansion-dictionary memory which follows the memory including the special data is not installed, the CPU 23 goes to step S41 wherein the CPU 23 transfers to the RAM 25 vocabulary data and address-number data which are stored in the data memory location of the basic-dictionary memory (first ROM 24) designated by the first start-address data of the special data which is stored in the first memory area (24b', 26b', ...) of the address-number memory location (24b, 26b, ... ).

In this example wherein the word "ARREST" is keyed in, step S38 is followed by S21 wherein the vocabulary data "CATCH" and address-number data "240" at address No. 260 are transferred to the RAM 25. As a result, the word "CATCH" is displayed in step S23.

Upon activation of the synonym-call key 16 again in this condition (S24), the CPU 23 goes, through steps S25 and S26, to step S42 to check if the retrieved data "240" is special data or not. Since the retrieved address-number data "240" is not special data, the CPU 23 goes to step S28, whereby the vocabulary data "CAPTURE", and the special data (first start-address data "120" and second start-address data "20") are transferred to the RAM 25 from the vocabulary-data memory location 24a, and from the first and second memory areas 24b' and 24b'' of the address-number memory location 24b at address No. 240. Then, the word "CAPATURE" is indicated on the display 18 as another synonym of the word "ARREST" (S29).

If the operator presses the synonym-call key 16 again to find a further synonym of the word "ARREST" (S24), the CPU 23 goes to step S42, through steps S25 and S26. Since the retrieved first and second address data "120" and "20" are special data, step S42 is followed by step S43 wherein the CPU 23 checks if the second ROM 26 (first expansion-dictionary memory) is installed or not. If the second ROM 26 is not installed, the CPU 23 goes to step S44 similar to step S41. As a result, the word "ARREST" stored at address No. 120 of the first ROM 24 is displayed (S29). In the instant example wherein the second ROM 26 is installed, step S43 is followed by step S45 similar to step S40, whereby the CPU 23 transfers to the RAM 25 vocabulary data "APPREHEND" and start-address data "520" which are stored in the data memory location 26a, 26b at address No. 20 of the second ROM 26 designated by the second start-address data "20" of the retrieved special data. Successively, the word "APPREHEND" is displayed (S29).

Further synonyms of the keyed-in word "ARREST" are displayed by operating the synonym-call key 16 (through execution of steps S24–S29). More specifically, the word "SEIZE" and the phrase "TAKE INTO CUSTODY" are indicated one after the other by operating the synonym-call key 16 twice (S24). If the operator operates the synonym-call key 16 again to find another synonym while the phrase "TAKE INTO CUSTODY" is indicated on the display 18, the CPU 23 retrieves, in step S26, the special data which has been stored in the RAM 25, i.e. the first and second start-address data "120" and "930" which are stored in the address-number memory location 26b at address No. 600 of the second ROM 26. In this instance, the checking in step S42 is affirmative, and step S43 is executed to check if the third ROM is installed or not. Since no third ROM is installed, step S43 is followed by step S44 in which the CPU 23 designates the address 120 of the first Rom 24 based on the first start-address data "120" of the retrieved special data, and retrieves the vocabulary data "ARREST" and address-number data "260" which are stored in the data memory location at address No. 120 of the first ROM 24. Successively, the retrieved vocabulary data "ARREST" is indicated on the display 18, as a synonym of the keyed-in word "ARREST".

While the typewriter 11 according to the aforementioned embodiment of FIGS. 13 and 14 is adapted to accept two expansion-dictionary memories, i.e., second ROM 26 and third ROM (not shown), it is possible that the typewriter 11 be adapted to accept three or more expansion-dictionary memories. In this instance, the corresponding number of detector switches 28 are disposed to sense the installation of the three or more expansion-dictionary memories.

Referring to FIGS. 16–20, 21A and 21B, a further modified embodiment of the invention will be described.

Figure 16:
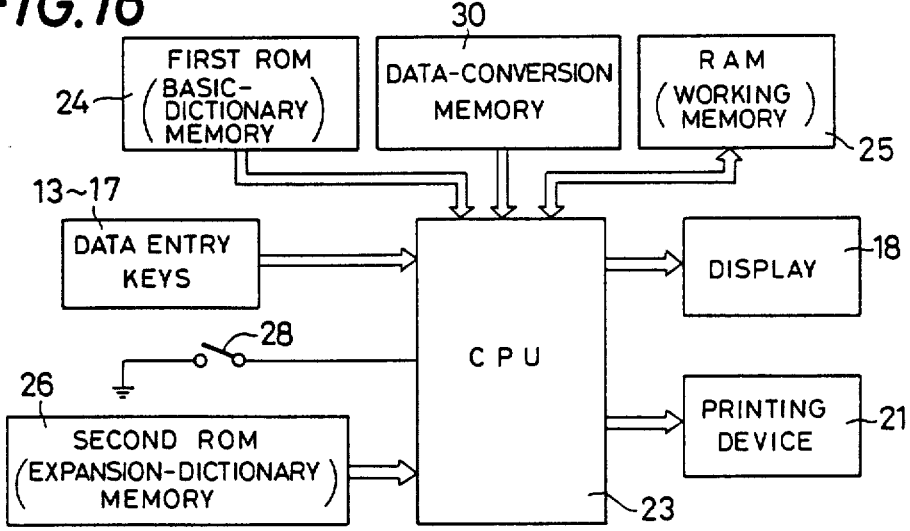
FIG. 16 is a schematic block diagram, corresponding to FIG. 6, showing an electric control system of a still further modified embodiment of the invention.

As shown in FIG. 16, this embodiment uses a data-conversion memory 30, in addition to the first and second ROMs 24, 26 and RAM 25. The data-conversion memory 30 will be described later in detail.

Figure 17:
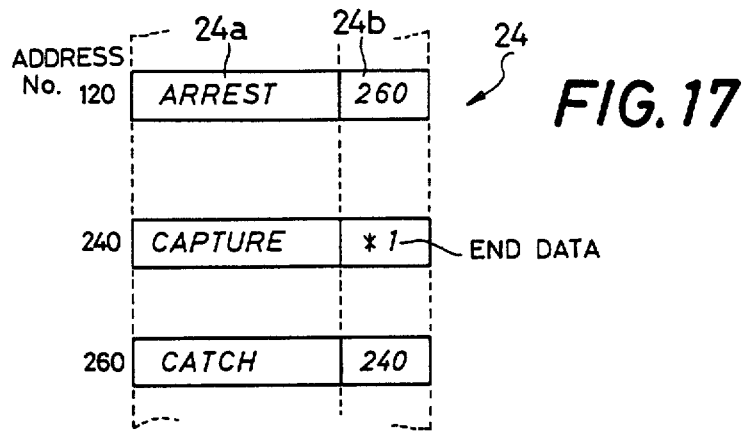
FIGS. 17, 18 and 19 are diagrammatic illustrations showing the arrangement of memories of the embodiment of FIG. 16.

There is illustrated in FIG. 17 an arrangement of the first ROM 24 wherein end data "*n", which is a combination of a special symbol "*" and numerical data, is stored in the address-number memory location 24b corresponding to the vocabulary-data memory location 24a storing a special vocabulary entry of each synonym group. For example, the end data "*1" in the address-number memory location 24 at address No. 240 indicates that the vocabulary entry "CAPTURE" at address No. 240 is a special vocabulary entry of a synonym group No. 1. In the same manner, special vocabulary entries of second and subsequent synonym groups stored in the first ROM 24 are indicated by similar end data, "*2", "*3", ... "*n".

Figure 18:
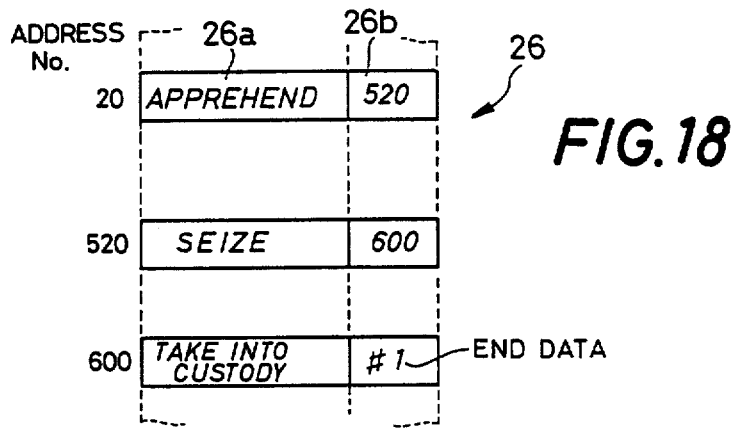

The second ROM 26 illustrated in FIG. 18 uses end data "#n" for indicating a special vocabulary entry of each synonym group. For example, the end data "#1" stored in the address-number memory location 26b at address 600 indicates that the vocabulary entry "TAKE INTO CUSTODY" at address No. 600 is a special vocabulary entry of a synonym group No. 1 in the second ROM 26.

Figure 19:
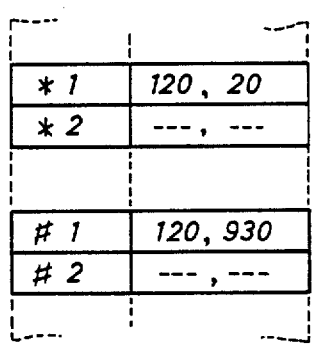

An arrangement of the data-conversion memory 30 is illustrated in FIG. 19, wherein there are provided multiple memory locations corresponding to the individual end data "*1", "*2", ... "*n" and "#1", "#2", ... "190 n" stored in the first and second ROMs 24, 26. Each of the data memory locations of the data-conversion memory 30 stores first start-address data and second start-address data in corresponding relation with the end data of the respective synonym group. The first start-address data is representative of the address of the vocabulary data of the corresponding group of the first ROM 24 which is to be retrieved first. On the other hand, the second start-address data is representative of the address of the vocabulary data of the corresponding group of the second ROM 26 or subsequent expansion-dictionary ROM (not shown) which is to be retrieved first. For example, the memory location of the data-conversion memory 30 which corresponds to the end data "*1" stores the first start-address data "120" and the second start-address data "20". The first start-address data "120" designates address No. 120 of the first ROM 24 at which is stored vocabulary data "ARREST" which is to be retrieved first in the synonym group including the special vocabulary entry "CAPTURE" at address No. 240. The second start-address data "20" designates address No. 20 of the second ROM 26 at which is stored vocabulary data "APPREHEND" which is to be retrieved first in the synonym group which is synonymous with the vocabulary entry "ARREST" of the first ROM 24.

Similarly, first start-address data "120" in the memory location of the data-conversion memory 30 corresponding to the end data "#1" designates address No. 120 of the first ROM 24, while second start-address data "930" in the same memory location designates address No. 930 of a third ROM (not installed) at which is stored a first retrieved vocabulary entry of a synonym group which is synonymous with the vocabulary entry "ARREST".

Figure 21A:
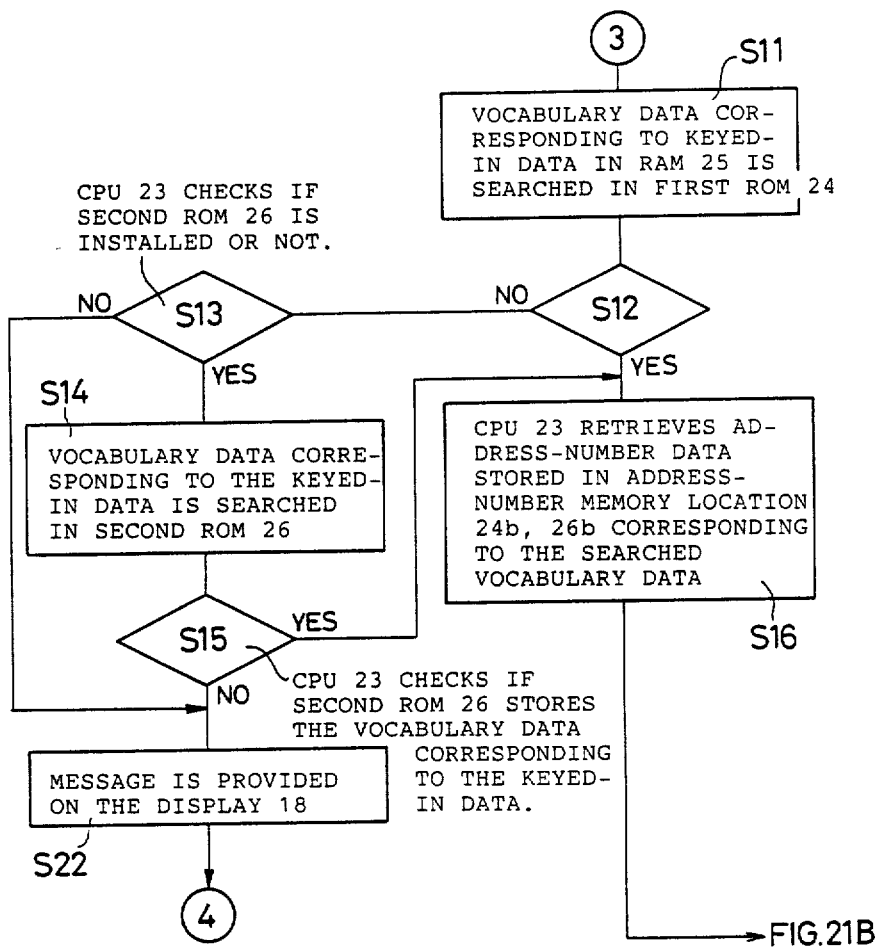

The operation of the above embodiment of FIGS. 16-19 will be described with reference to flow charts of FIGS. 20, 21A and 21B, wherein the same step numbers as used in FIGS. 10, 11A, 11B, 15A and 15B are used to indentify the corresponding steps of operation.

Upon application of power to the typewriter 11 with a power ON-OFF switch 29 (FIG. 4) turned ON, the CPU 23 clears the RAM 25 in S46 (FIG. 20), and then checks in step S47 to see whether the second ROM 26 is installed or not based on a signal from the detector switch 28 (FIG. 16). In the instant example wherein the second ROM 26 is installed in place, the CPU 23 goes to step S48 in which the CPU 23 selects the second start-address data of the data-conversion memory 30 corresponding to each end data of the first ROM 24, and the first start-address data corresponding to each end data of the second ROM 26, so that synonym groups of the first and second ROMs 24, 26 are connected in a loop. In the case where the second ROM 26 is not actually installed in the typewriter 11, the CPU 23 goes to step S49 which will be described.

Then, the CPU 23 is ready to achieve the steps S1–S16 which have been described in connection with the first embodiment referring to FIGS. 10 and 11A. For example, if the word "ARREST" is entered, address No. 120 of the first ROM 24 is searched (S11— FIG. 21A), and address-number data "260" at the searched address No. 120 is retrieved (S16). Successively, the CPU 23 goes to step S50 (FIG. 21B) to check if the retrieved address-number data "260" is special data, i.e., end data. Since the retrieved data "260" is not end data, the CPU 23 goes to step S21, and then to step S23 wherein the word "CATCH" is displayed. By operating the synonym-call key 16 in step S24, the next synonym (special vocabulary entry of the group) "CAPTURE" is displayed in step S23 after the execution of steps S25, S26, S50 and S21. If the synonym-call key 16 is operated again in step S24, the end data "*1" is retrieved from the RAM 25 in step S26, and the CPU 23 judges in step S50 that the end data "*1" has been retrieved. As a result, the CPU 23 goest to step S51 wherein the CPU 23 retrieves from the RAM 25 the second start-address data "20" corresponding to the end data "*1", which data "20" has been stored in the RAM 25 in the previously described step S48. The CPU 23 then transfers to the RAM 25 vocabulary data "APPREHEND" and address-number data "520" which are stored in the data memory location at address No. 20 of the second ROM 26 which is designated by the retrieved second start-address data "20". Subsequently, the word "APPREHEND" is displayed in step S23.

In the same manner, the other two synonyms "SEIZE" and "TAKE INTO CUSTODY" of the synonym group in the second ROM 26 are displayed by operating the synonym key 16. If the synonym-call key 16 is operated in step S24 after the synonym "TAKE INTO CUSTODY" is displayed (S23), the end data "#1" which has been stored in the RAM 25 (S21) is retrieved in step S26. Then, the CPU 23 judges in step S50 that the data "#1" is end data, and therefore goes to execute step S51. In this step S51, the CPU 23 retrieves from the RAM 25 the first start-address data "120" which has previously been selected and transferred to the RAM 25 in step S48 based on the fact that no second expansion-dictionary ROM (third ROM) is installed in the typewriter 11. In the following step S23, the word "ARREST" is again displayed.

If a third ROM serving as a second expansion-dictionary memory is actually installed in the typewriter 11, the CPU 23 selects in step S48, the second start-address data "930" at the memory location of the data-conversion memory 30 which corresponds to the end data "#1" and transfers that second start-address data "930" to the RAM 25. In this instance, the CPU 23 retrieves in step S51 the second start-address data "930" from the RAM 25 when the end data "#1" is retrieved. Accordingly, a synonym group in the third ROM is displayed beginning with a synonym stored at address No. 930 of the third ROM.

If the second ROM 26 is not actually installed in the expansion ROM-module receptacle 27, the CPU 23 selects, in the previously indicated step S49, the first start-address data of the data-conversion memory 30 which corresponds to the end data of each synonym group stored in the first ROM 24, so that the synonym retrieval is accomplished within a synonym group of the first ROM 24. The CPU 23 transfers to the RAM 25 the selected first start-address data, for example, start-address "120" corresponding to the end data "*1". Hence, when the end data "*1" is retrieved, the CPU 23 transfers to the RAM 25 the vocabulary data "ARREST" and address-number data "260" which are stored at address No. 120 designated by the retrieved first start-address data "120".

Although the typewriter 11 in the instant embodiment is adapted to accept the first and second expansion-dictionary memories (second ROM 26, and third ROM which is not actually installed in the illustrated example of operation), it is possible that the typewriter 11 be adapted to accept three or more expansion-dictionary memories. In this case, separate detector switches are provided to sense the installation of the individual expansion-dictionary memories.

As described hitherto, the present modified embodiment of the invention according to FIGS. 16-20, 21A and 21B is capable of displaying plural synonym groups by scanning the basic-dictionary memory and one or more expansion-dictionary memories, by means of the previously described end data stored in each memory to represent the special vocabulary entry of each synonym group, and by means of the data-conversion memory 30 each memory location of which stores the first and second address-number data. The CPU 23 selects the first or second address-number data based on the signals from the detector switches (28) which detect the installation of the respective expansion-dictionary memories, so that the synonym groups of the basic-dictionary memory and the installed expansion-dictionary memory or memories are connected together in a large loop if the expansion-dictionary memory or memories are installed, and so that the vocabulary entries of the synonym group in the basic-dictionary memory are connected together in a small loop if any expansion-dictionary memory is not installed. In this meaning, the data-conversion memory 30 may be considered to serve as a linking-data memory which stores large-loop linking data for connecting the vocabulary entries of each group in the basic-dictionary memory to the vocabulary entries of at least one group in at least one expansion-dictionary memory, and which further stores small-loop linking data for connecting the vocabulary entries of each group in the basic-dictionary memory.

Referring further to FIGS. 22-25, 26A and 26B, a still further modified embodiment of the invention will be described.

Figure 22:
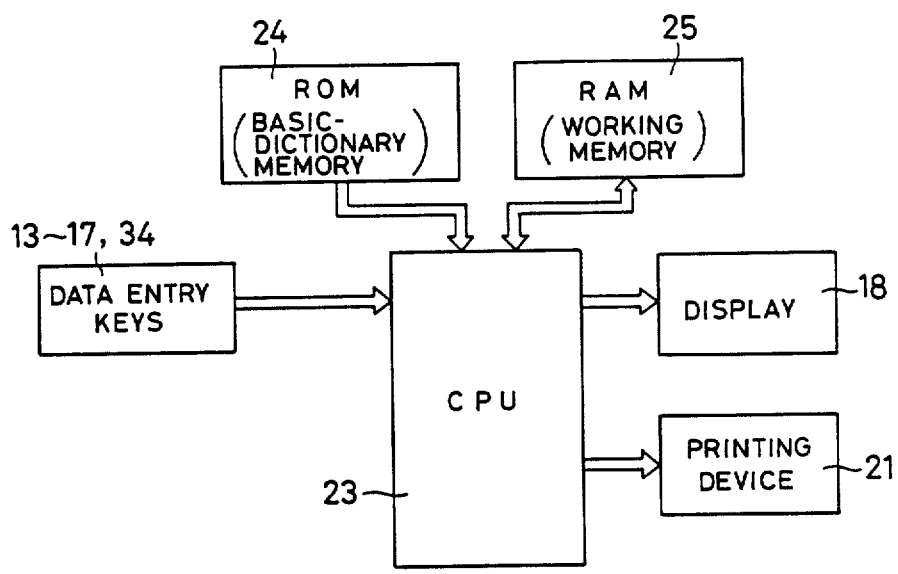
FIG. 22 is a schematic block diagram of an electric control system according to another embodiment of the invention.

As shown in FIG. 22, the typewriter 11 according to this embodiment uses only the basic-dictionary memory in the form of the ROM 24 for storing vocabulary data representative of different vocabulary entries. The keyboard 12 includes a group selector key 34 as shown in FIG. 4. The function of this selector key 34 will be described later in detail.

Figure 23:
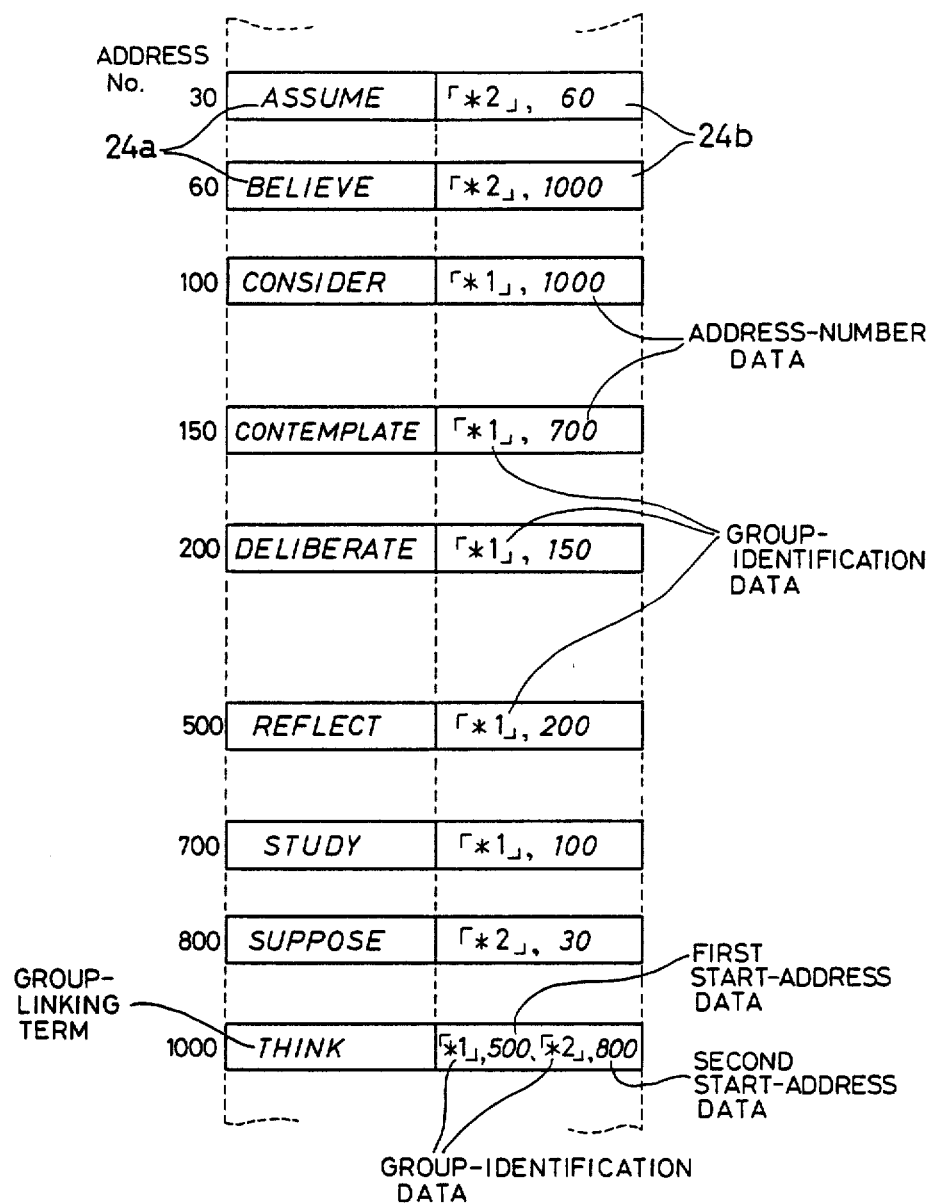
FIG. 23 is a diagrammatic illustration of a dictionary memory used in the embodiment of FIG. 22.
Figure 24:
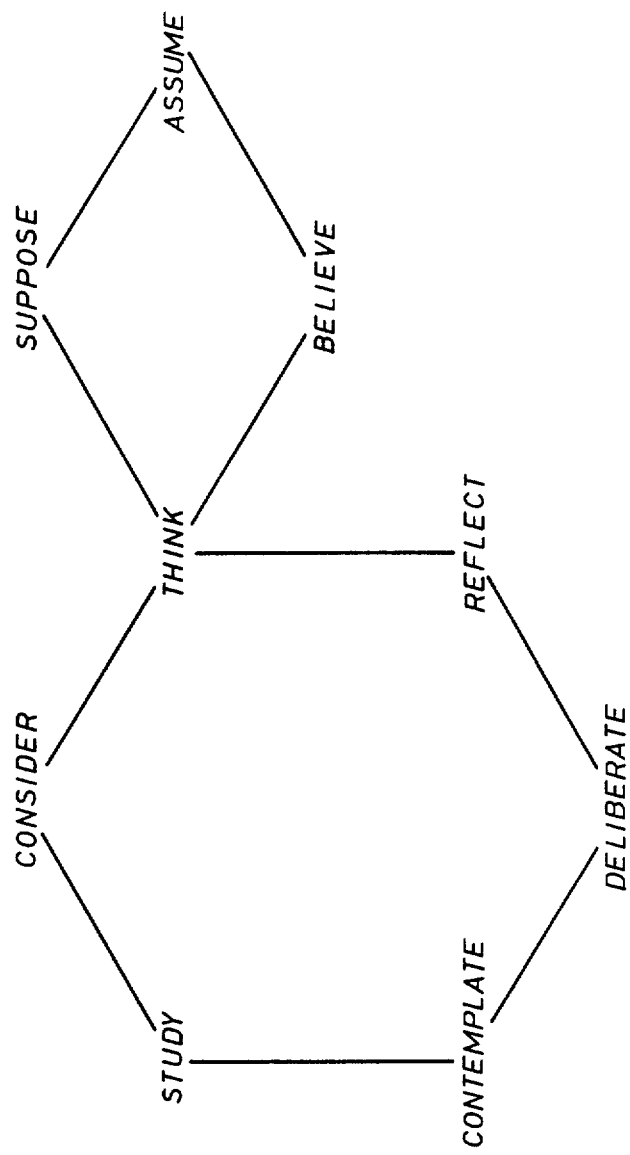
FIG. 24 is a view showing two groups of synonyms connected to each other.
Figure 26A:
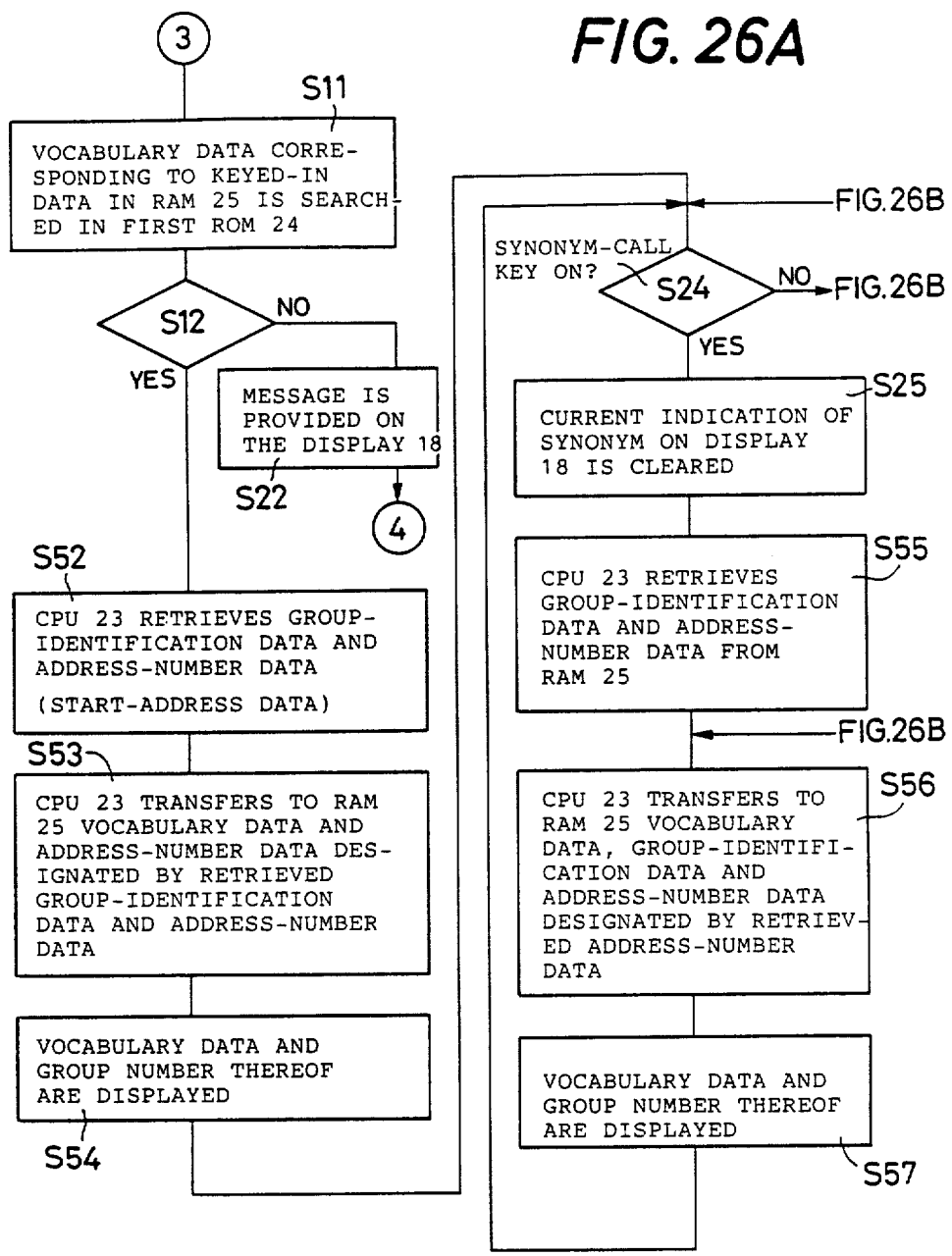

As in the preceding embodiment, the vocabulary data are stored in the ROM 24 in the vocabulary-data memory locations 24a such that the vocabulary entries represented by the vocabulary data are arranged in the alphabetical order as illustrated in FIG. 23. The vocabulary entries stored in the ROM 24 include plural group-linking terms. Each of these group-linking terms belongs to one of plural synonym groups, and at the same time belongs to another of the plural synonym groups. For example, as illustrated in FIG. 24, the word "THINK" belongs to a synonym group (hereinafter referred to as "first synonym group") which consists of words "REFLECT", "DELIBERATE", "CONTEMPLATE", "STUDY", "CONSIDER" and "THINK", and also belongs to another synonym group (hereinafter called "second synonym group") which consists of words "SUPPOSE", "ASSUME", "BELIEVE" and "THINK". It will be understood that the first synonym group consists of vocabulary entries which are synonymous with one of plural meanings of the group-linking term "THINK", while the second synonym group consists of vocabulary entries which are synonymous with another of the plural meanings of the group-linking term. The group selector key 34 selects one of these first and second synonym groups.

Group-identification data and address-number data are stored in the address-number memory locations 24b as shown in FIG. 23. Each address-number data represents an address of the data memory location 24a of the ROM 24 at which is stored a vocabulary entry which is retrieved next. The group-identification data represents a group which includes the vocabulary entry stored at the vocabulary-data memory location 24a corresponding to the address-number memory location 24b at which is stored that group-identification data. Since the word "THINK" belongs to two different synonym groups, the corresponding address-number memory location 24b stores two group-identification data "*1" and "*2". In the illustrated example, the address-number memory location 24b corresponding to vocabulary data "CONSIDER" of the first synonym group at address No. 100 stores group-identification data "*1" and address-number data "1000" which designate address No. 1000 at which the group-linking term "THINK" is stored. Similarly, the address-number memory locations 24b corresponding to vocabulary data which represent other entries of the first group, store the group-identification data "*1", and address-number data to designate the entries of the first group which are retrieved in a predetermined order. In the same way, the address-number memory locations 24b corresponding to vocabulary data of the second synonym group store group-identification data "*2", and address-number data representative of address Nos. at which the entries of the second synonym group are stored, so that the members of the second synonym group are retrieved in a predetermined order.

It is noted that the address-number memory location 24b at address No. 1000 corresponding to the group-linking term "THINK" stores two address-number data "500" and "800", followed by the group-identification data "*1" and "*2", respectively. The data "500" and "800" are referred to as first and second start-address data, respectively. The first start-address data "500" followed by the group-identification data "*1" designates address No. 500 at which is stored the word "REFLECT" which belongs to the first synonym group. In the meantime, the second start-address data "800" followed by the group-identification data "*2" designates address No. 800 at which is stored the word "SUPPOSE" which belongs to the second synonym group.

Referring to FIGS. 10, 25, 26A and 26B, the operation of the instant embodiment will be described.

Figure 10:
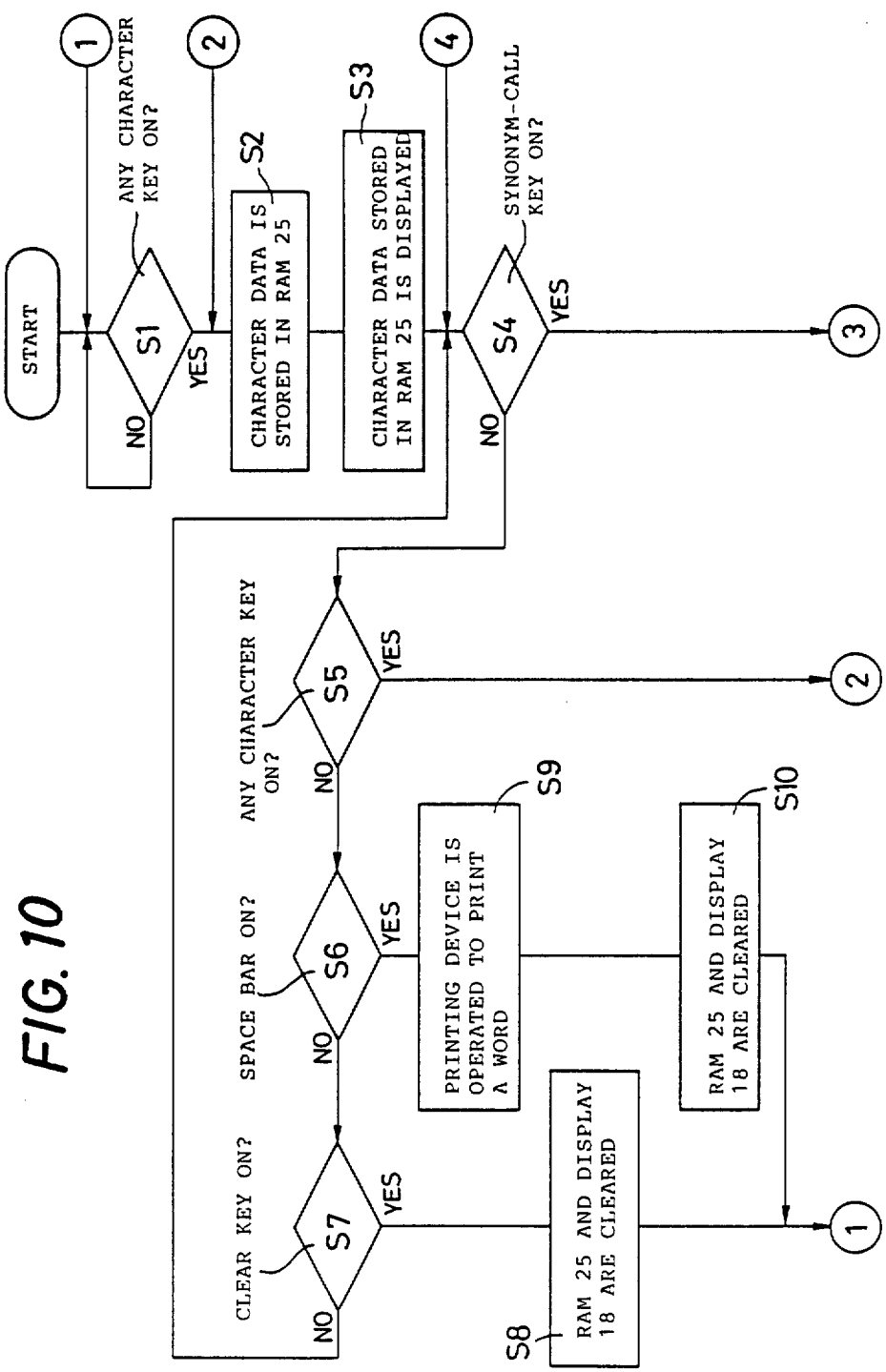
Figure 25:
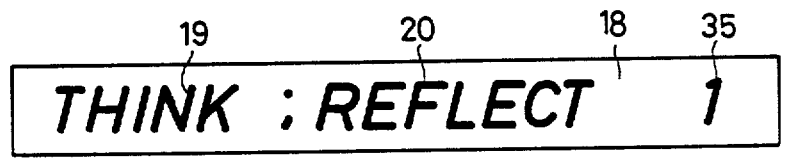
FIG. 25 is a view of the display corresponding to FIG. 5.

If it is desired to know synonyms of the word "THINK", for example, the characters "T", "H", "I", "N" and "K" are first keyed in through the keyboard 12 through repeated execution of steps S1-S3 as indicated in FIG. 10. The keyed-in word "THINK" is indicated on the display 18, as indicated at 19 in FIG. 25 (S3). Then, the synonym-call key 16 is operated (S4). Subsequently, the following steps are executed according to the flow charts of FIGS. 26A and 26B. Initially, the CPU 23 goes to step S11 (FIG. 26A) in which address No. 1000 at which is stored the word "THINK" is searched. If the word "THINK" is searched (S12), the CPU 23 goes to step S52 to retrieve from the address-number memory location 24b at address No. 1000 the group-identification data "*1" and first start-address data "500". Step S52 is followed by step S53 in which the CPU 23 transfers to the RAM 25 vocabulary data "REFLECT", group-identification data "*1" and first start-address data (address-number data) "200". Successively, the CPU 23 executes step S54 to cause the display 18 to indicate the word "REFLECT" as a synonym 20 of keyed-in word "THINK" 19, and the appropriate group number "1", as illustrated in FIG. 25. The group number "1" is indicated at 35 in FIG. 25. Thus, the operator may know that the displayed word "REFLECT" is a synonym of the keyed-in word "THINK", and that the displayed synonym "REFLECT" belongs to the first synonym group.

If the synonym-call key 16 is operated again in this condition (S24), the displayed word "REFLECT" is cleared (S25), and the CPU 23 retrieves, in step S55, the group-identification and address-number data "*1 200" from the RAM 25. Subsequently in step S56, the CPU 23 transfers to the RAM 25 vocabulary data "DELIBERATE", group-identification data "*1" and address-number data "150" which are stored in the data memory location 24a, 24b at address No. 200 designated by the retrieved address-number data "200". Step S56 is followed by step S57 in which the word "DELIBERATE" and the group number "1" are indicated on the display 18. Then, the CPU 23 goes back to step S24.

In the same way, the other words of the first synonym group are displayed in the order of "CONTEMPLATE", "STUDY" and "CONSIDER" at address Nos. 150, 700 and 100, by operating the synonym-call key 16. If the synonym-call key 16 is operated (S24) while the word "CONSIDER" is displayed as a synonym, the word "THINK" is displayed as a synonym 20 of the keyed-in word "THINK" 19 (S57). If the operator wishes to know synonyms of the second group, the group selector key 34 is operated (S58). Then, the CPU 23 checks in step S59 to see if the address-number memory location 24b at address No. 1000 stores another set of group-identification and start-address data. In this specific example, the data in the address-number memory location 24b at address No. 1000 contains the second set of data "*2" and "800". Consequently, the CPU 23 goes to step S60 to retrieve these group-identification data "*2" and second start-address data "800" and transfers these data to the RAM 25. Step S60 is followed by step S56 wherein the CPU 23 retrieves the vocabulary data "SUPPOSE" and data "*2 30" which are stored in the data memory location at address No. 800. As a result, the word "SUPPOSE" and group number "2" are indicated on the display 18 (S57).

The other synonyms of the second group "ASSUME" and "BELIEVE" are displayed by operating the synonym-call key 16, through repeated execution of steps S24 through S57.

As described heretofore, the instant embodiment is capable of displaying the first and second synonym groups of the word "THINK", by repeatedly operating the synonym-call key 16, and using the group selector key 34.

If the operator likes to print the word "STUDY" as a synonym of the word "THINK", the space key 15 is operated (S33), and the word "STUDY" is printed on the sheet 22 by the printing device 21 (S34). The CPU 23 then clears the RAM 25, and removes the indication of the word "STUDY", and goes to step S1 in which the CPU 23 is ready to accept the entry of a new character (new word) to be printed in a normal manner. If it is desired to cancel the keyed-in word ("THINK" in the illustrated example), the clear key 17 is operated (S36), and the RAM 25 and the indication of the keyed-in word are cleared (S37) as previously discussed with reference to FIG. 10.

While the two synonym groups are provided for the word "THINK" in the foregoing illustrated embodiment, it is possible that a group-linking term (e.g., "THINK") belongs to three more synonym groups. In this instance, the corresponding sets of group-identification data and start-address data are stored in the address-number memory location 24b at the address corresponding to the group-linking term. The three or more sunonym groups are selected one after another by repeatedly pressing the group selector key 34.

While the present invention has been described in its several preferred embodiments, it is to be understood that the invention is not confined to the precise disclosure herein, and that various changes, modifications and improvements may be made in the invention which do not affect the spirit of the invention nor exceed the scope thereof as expressed in the appended claims.

What is claimed is:

1. An electronic dictionary comprising:
(a) a dictionary memory having a multiplicity of data memory locations identified by respective addresses wherein:
each of said data memory locations comprises a vocabulary memory location and a corresponding address memory location;
said vocabulary memory locations store different vocabulary entries, said vocabulary entries including plural groups of related vocabulary entries and at least one of said related vocabulary entries of each of said groups constituting a corresponding at least one linking vocabulary entry for the corresponding group, each of said linking vocabulary entries being related to a corresponding other of said groups; and wherein, for each of said groups:
each of said corresponding address memory locations for said related vocabulary entries not constituting said at least one linking vocabulary entry of the group stores data designating the address number of the vocabulary memory location at which is stored a predetermined different vocabulary entry of the group which is next to be retrieved; and
the corresponding at least one address memory location for said at least one linking vocabulary entry of the group stores linking data for use in retrieving a predetermined vocabulary entry from said corresponding other of said groups;
(b) input means for designating one of said different vocabulary entries;
(c) search means responsive to said input means for locating the vocabulary memory location at which the vocabulary entry designated by said input means is stored;
(d) retrieval means responsive to said search means for (i) first retrieving the data stored in the corresponding address memory location for said vocabulary memory location located by said search means; and (ii) second retrieving, if said first or subsequently retrieved data is address-number data, the vocabulary entry stored in the vocabulary memory location designated by the retrieved address-number data; and further retrieving the data stored in the corresponding address memory location for the retreived vocabulary entry;
(e) group-linking means responsive to said retrieval means for linking, if said first or subsequently retrieved data is linking data, the currently retrieved group of vocabulary entries with a different group by (i) designating, based on the retrieved linking data, the address number of the vocabulary memory location for said predetermined vocabulary entry from said corresponding other of said groups which is associated with the retrieved linking data; and (ii) causing said retrieval means to retrieve said predetermined vocabulary entry from said corresponding other of said groups; and (f) display means for displaying each vocabulary entry retrieved by said retrieval means.

2. An electronic dictionary as set forth in claim 1, wherein said dictionary memory comprises a basic-dictionary memory which stores at least one of said plural groups of vocabulary entries; and further comprises at least one expansion-dictionary memory which is optionally installed in the electronic dictionary and which stores at least one of said plural groups which is different from said at least one group stored in said basic-dictionary memory, said at least one linking vocabulary entry of said at least one group of vocabulary entries stored in said basic-dictionary memory being related to said at least one group stored in said at least one expansion-dictionary memory.

3. An electronic dictionary as set forth in claim 2, wherein said plural groups of related vocabulary entries each consist of vocabulary entries which are synonymous with each other.

4. An electronic dictionary as set forth in claim 3, wherein:

the vocabulary entries of each of said groups are arranged so as to be successively retrieved in a predetermined order, and each of said groups contains a single linking vocabulary entry which is last in order of retrieval;

said linking data for each of said groups comprises start-address data and end data, said start-address data signifying the address of the vocabulary entry of the group which is first in order of retrieval, and said end data signifying that the corresponding linking vocabulary entry of the group is the vocabulary entry of the group which is last in order of retrieval;

said dictionary memory comprises one expansion-dictionary memory which is optionally installed in the electronic dictionary; and said group-linking means comprises:
  start-address memory means for storing a first set of start-address data for each of said groups of vocabulary entries in said basic-dictionary memory and a second set of start-address data for each group stored in said one expansion-dictionary memory, said first and second sets of start-address data corresponding to each other; and
  checking and processing means for checking whether said one expansion-dictionary memory is installed; and (i) if said one expansion-dictionary is not installed, causing, when the retrieved data is linking data, said retrieval means to retrieve the vocabulary entry stored in said basic vocabulary memory which is designated by the start-address data from said first set which comprises the retrieved linking data; and (ii) if said one expansion-dictionary memory is installed in the dictionary memory, causing, when the retrieved data is linking data, said retrieval means to retrieve the vocabulary entry stored in said one expansion-dictionary memory which is designated by the start-address data from said second set which corresponds to the start-address data comprising the retrieved linking data.

5. An electronic dictionary as set forth in claim 4, wherein said expansion-dictionary memory includes memory locations which constitute said start-address memory.

6. The electronic dictionary as set forth in claim 3, wherein:

said linking data comprises end data which is indicative of each of said plural groups of vocabulary entries; and said group-linking means comprises:
  start-address memory means for storing first and second start-address data corresponding to the end data for each of said plural groups of vocabulary entries, each of said first start-address data designating the address of the vocabulary entry of the corresponding group stored in said basic-dictionary memory which is first in order of retrieval, and each of said second start-address data designating the address of the vocabulary entry of the corresponding group stored in said at least one expansion-dictionary memory which is first in order of retrieval; and
  checking and processing means for checking whether the at least one expansion-dictionary memory is installed in which is stored the vocabulary entry designated for next retrieval based on the end data of the retrieved linking data; and (i) if the designated at least one expansion-dictionary memory is not installed, causing said retrieval means to retrieve the vocabulary entry stored in said basic-dictionary memory designated by the first start-address data associated with the retrieved end data; and (ii) if the designated at least one expansion-dictionary memory is installed, causing said retrieval means to retrieve the vocabulary entry stored in the at least one expansion-dictionary memory designated by the second start-address data associated with the retrieved end data.

7. The electronic dictionary as set forth in claim 6, wherein:

said checking and processing means comprises a working memory for temporary storage of data being processed, and is adapted such that upon commencing energization of the electronic dictionary a selected one of said first and second start-address data is transferred from said start-address memory to said working memory based on whether and which of said at least one expansion-dictionary memory is installed, such that said checking and processing means retrieves the selected one of said first and second start-address data from said working memory in response to retrieval of said end data by said retrieval means.

8. An electronic dictionary as set forth in claim 3, wherein:

said dictionary memory comprises plural expansion-dictionary memories which are optionally installed in the electronic dictionary;

the vocabulary entries in each of said groups are arranged so as to be successively retrieved in a predetermined order, and each of said groups contains a single linking vocabulary entry which is last in order of retrieval;

said linking data for each group stored in said basic-dictionary memory comprises first start-address data and first end data, said first start-address data signifying the address of the vocabulary entry of each basic-dictionary group which is first in order of retrieval, said first end data signifying that the corresponding linking vocabulary entry is the vocabulary entry of the group which is last in order of retrieval;

said linking data for each group stored in each of said plural expansion-dictionary memories comprises said first start-address data and second end data, each of said second end data signifying that the corresponding linking vocabulary entry is the vocabulary entry of the corresponding group which is last in order of retrieval;

said first end data and the second end data in said plural expansion-dictionary memories being different from each other, and the second end data in one of said plural expansion-dictionary memories being different from the second end data in the other one or ones of said plural expansion-dictionary memories, each of said first and second end data designating the dictionary memory which stores the vocabulary entry that is to be retrieved following the vocabulary entry corresponding to each of said end data; and said group-linking means comprises:
- a start-address memory for each of said plural expansion-dictionary memories, each of said start-address memories storing said first start-address data and second start-address data associated with said first start-address data, each of said second start-address data designating the address of the vocabulary entry of the corresponding group of the corresponding expansion-dictionary memory which is first in order of retrieval; and
- checking and processing means for checking whether the expansion-dictionary memory designated by the end data of the retrieved linking data is installed; and (i) if the designated expansion-dictionary memory is not installed, causing said retrieval means to retrieve the vocabulary entry stored in said basic-dictionary memory at the address designated by the retrieved first start-address data associated with the retrieved end data; and (ii) if the designated expansion-dictionary memory is installed, causing said retrieval means to retrieve the vocabulary entry stored in the designated expansion-dictionary memory at the address designated by the second address data associated with the retrieved first address data.

9. An electronic dictionary as set forth in claim 3, wherein:

the vocabulary entries in each of said groups are arranged so as to be successively retrieved in a predetermined order, and each of said groups contains a single linking vocabulary entry which is last in order of retrieval;

said linking data stored in association with each linking vocabulary entry comprises first start-address data and corresponding second start-address data, said first start-address data designating the address of the vocabulary entry of the corresponding group stored in said basic-dictionary memory which is first in order of retrieval, and said corresponding second start-address data designating the address of the vocabulary entry of the corresponding group stored in said at least one expansion-dictionary memory which is first in order of retrieval; and said group-linking means comprises checking and processing means for checking whether the at least one expansion-dictionary memory is installed in which is stored the vocabulary entry designated by the second start-address of the retrieved linking data for the next retrieval; and (i) if the designated at least one expansion-dictionary memory is not installed, causing said retrieval means to retrieve the vocabulary entry stored in said basic-dictionary memory designated by the first start-address data of the retrieved linking data; and (ii) if the designated at least one expansion-dictionary memory is installed, causing said retrieval means to retrieve the vocabulary entry stored in the expansion-dicationary memory designated by the second start-address data of the retrieved linking data.

10. The electronic dictionary as set forth in claim 3, wherein said group-linking means comprises:

link-data memory means for storing large-loop and small-loop link data corresponding to the linking data for each group; said large-loop link data being used to link for retrieval the corresponding at least one linking vocabulary entry in each of said at least one group stored in the basic-dictionary memory with the corresponding other of said groups stored in said at least one expansion-dictionary memory; and said small-loop link data being used to link for retrieval each corresponding at least one linking vocabulary entry stored in the basic-dictionary memory with each corresponding other of said groups stored in the basic-dictionary memory; and checking and processing means for checking whether said at least one expansion-dictionary memory is installed; and when linking data is retrieved by said retrieving means, selecting said small-loop link data for retrieval of the next vocabulary entry if the at least one expansion-dictionary memory designated by the retrieved linking data is not installed, and selecting said large-loop link data for retrieval of the next vocabulary entry if the at least one expansion-dictionary memory designated by the retrieved linking data is installed.

11. The electronic dictionary as set forth in claim 1, wherein said different vocabulary entries include a group-linking term which belongs to one of said plural groups and to another of said plural groups, said one group consisting of vocabulary entries which are synonymous with one of plural meanings of said group-linking terms, said another group consisting of vocabulary entries which are synonymous with another meaning of said group-linking term, said group-linking term serving as said linking vocabulary entry common to said one and another groups, said group-linking means linking said one and another groups at said group-linking term.

12. The electronic dictionary as set forth in claim 11, wherein said linking data comprises first and second start-address data which represent the addresses of the vocabulary entries which are first in order of retrieval in said one and another groups, respectively; said group-linking means comprising selector means for selecting one of said first and second start-address data.

13. The electronic dictionary as set forth in claim 12, wherein each of said address memory locations stores, in addition to said address-number data or said special data, group-identification data representative of the group to which the vocabulary entry in the vocabulary memory location corresponding to said each address-number memory location belongs; said group-linking means selecting one of said first and second start-address data, based upon said group-identification data.

14. The electronic dictionary as set forth in claim 11, wherein said display means indicates, in addition to the vocabulary entry which has been retrieved by said retrieval means, a group-identification symbol which represents one of said one and another groups to which the indicated vocabulary entry belongs.

15. The electronic dictionary as set forth in claim 1, wherein said different vocabulary entries include a group-linking term which belongs to one of said plural groups and to another of said plural groups, said one group consisting of vocabulary entries which are synonymous with one of plural meanings of said group-linking term, said another group consisting of vocabulary entries which are synonymous with another meaning of said group-linking term, said group-linking term serving as said linking vocabulary entry common to said one and another groups; each of said address-number memory locations stores, in addition to said address-number data or said linking data, group-identification data respresentative of the group to which the vocabulary entry in the vocabulary memory loction corresponding to said each address-number memory location; said group-linking means selecting the vocabulary entry which is retrieved following said group-linking term based on said group-identification data when said linking data is retrieved by said retrieval means.

* * * * *